US011548037B1

(12) United States Patent
Hoffman

(10) Patent No.: US 11,548,037 B1
(45) Date of Patent: Jan. 10, 2023

(54) PHARMACY ORDER PROCESSING SYSTEM CONTAINER SORTING DEVICES AND RELATED METHODS

(71) Applicant: Express Scripts Strategic Development, Inc., St. Louis, MO (US)

(72) Inventor: Robert E. Hoffman, Linden, IN (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 777 days.

(21) Appl. No.: 16/581,977

(22) Filed: Sep. 25, 2019

Related U.S. Application Data

(60) Provisional application No. 62/738,932, filed on Sep. 28, 2018.

(51) Int. Cl.
*B07C 5/06* (2006.01)
*B07C 3/08* (2006.01)
*B07C 5/12* (2006.01)
*B07C 5/02* (2006.01)
*B07C 5/34* (2006.01)
(Continued)

(52) U.S. Cl.
CPC .................. *B07C 5/36* (2013.01); *B07C 3/08* (2013.01); *B07C 5/02* (2013.01); *B07C 5/122* (2013.01); *B07C 5/3412* (2013.01); *B07C 5/361* (2013.01); *B25J 9/0096* (2013.01); *B65B 17/02* (2013.01); *B65G 47/261* (2013.01); *B65G 47/30* (2013.01); *B65G 47/846* (2013.01); *F15B 1/02* (2013.01); *G06Q 10/087* (2013.01); *G06Q 30/0635* (2013.01)

(58) Field of Classification Search
CPC .... B07C 5/36; B07C 3/08; B07C 5/02; B07C 5/122; B07C 5/3412; B07C 5/361; B65B 17/02; B65G 47/261; B65G 47/30; B65G 47/846; B25J 9/0096; F15B 1/02; G06Q 10/087; G06Q 30/0635
See application file for complete search history.

(56) References Cited

U.S. PATENT DOCUMENTS 7,235,756 B2    6/2007  De Leo
7,331,471 B1 *  2/2008  Shakes ................... B07C 7/005
                                                        209/559

(Continued)

*Primary Examiner* — Thomas Randazzo
(74) *Attorney, Agent, or Firm* — Schwegman Lundberg & Woessner

(57) ABSTRACT

An order processing system, such as may be used in a high-volume pharmacy, may include a material handling system, an accumulator, and a packing device. The material handling system may move containers through a plurality of container paths. The container sorting device may receive the containers, scan the plurality of containers to detect container identifiers, and separate the containers based on the container identifiers to travel through a first container exit path or a second container exit path. The accumulator may accumulate containers that traveled through the first container exit path and the second container exit path. The accumulator may include an accumulator scanning device for scanning the containers to detect the container identifiers. The accumulator may group the containers together based on the detected container identifiers and orders, and provide the grouped containers. The packing device may package the grouped containers along with literature associated with the orders.

28 Claims, 17 Drawing Sheets

(51) Int. Cl.
*B07C 5/36* (2006.01)
*B65G 47/26* (2006.01)
*B65G 47/30* (2006.01)
*B65G 47/84* (2006.01)
*B25J 9/00* (2006.01)
*B65B 17/02* (2006.01)
*G06Q 30/06* (2012.01)
*F15B 1/02* (2006.01)
*G06Q 10/08* (2012.01)

(56) References Cited

U.S. PATENT DOCUMENTS

| | | |
|---|---|---|
| 7,974,891 B2 | 7/2011 | Shakes |
| 8,091,320 B2 | 1/2012 | Mahar |
| 8,457,781 B2 | 6/2013 | Bailey |
| 8,952,284 B1 * | 2/2015 | Wong .................. G05B 15/02 |
| | | 209/586 |
| 9,020,634 B2 | 4/2015 | Bailey |
| 9,242,751 B1 * | 1/2016 | Joplin .................. B07C 5/3412 |
| 10,252,861 B2 | 4/2019 | Mathi |
| 10,384,870 B2 | 8/2019 | Geiger |
| 2004/0260424 A1 | 12/2004 | Mahar |
| 2007/0067250 A1 | 3/2007 | Mahar |
| 2008/0154425 A1 | 6/2008 | Driskill |
| 2016/0023787 A1 * | 1/2016 | Joplin .................. B65B 43/46 |
| | | 198/340 |
| 2016/0026774 A1 * | 1/2016 | Joplin .................. B65G 1/1378 |
| | | 700/216 |
| 2017/0119629 A1 * | 5/2017 | Joplin .................. B65B 43/52 |
| 2018/0362254 A1 * | 12/2018 | Joplin .................. G16H 20/10 |

\* cited by examiner

PHARMACY ORDER PROCESSING SYSTEM CONTAINER SORTING DEVICES AND RELATED METHODS

CLAIM OF PRIORITY

This application claims the benefit of priority under 35 U.S.C. § 119(e) of U.S. Provisional Patent Application Ser. No. 62/738,932, filed on Sep. 28, 2018, and titled "PHARMACY ORDER PROCESSING SYSTEM CONTAINER SORTING DEVICES AND RELATED METHODS", which is incorporated by reference herein in its entirety.

TECHNICAL FIELD

The present disclosure relates generally to automated filling centers and more particular fulfillment center such as a high-volume pharmacy used in filling prescriptions and prescription orders.

BACKGROUND

Pharmaceutical order processing systems typically involve labor intensive and/or complicated processes to sort portions of an order such that the various portions of the order may be correctly processed and/or joined up with other portions of the pharmacy order for packaging and shipment to the customer. Many of the pharmacy orders are custom or specialty pharmacy orders that require multiple types of pharmaceuticals, each contained within different containers that may originate from different areas within the pharmaceutical order processing system. The process for filling the orders is difficult to efficiently complete and requires substantial operator interaction throughout the process to ensure the containers reach their required destinations within the pharmaceutical order processing system. Improved systems and methods for filling custom, specialty, and multi-part pharmacy orders at a high volume to improve order fulfillment realization and customer satisfaction are needed.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

This Summary includes examples that provide an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

An example of subject matter (such as a system, a device, apparatus or machine) may include a material handling system, an accumulator, and a packing device. The material handling system may be configured to move a plurality of containers through a plurality of container paths. The plurality of container paths may include a container sorting input path, a first container sorting output path, a second container sorting output path, at least one accumulator input path, an accumulator output path. The container sorting device may be configured to receive the plurality of containers from the container sorting input path of the material handling system, scan the plurality of containers to detect container identifiers for the plurality of containers, and separate the containers based on the container identifiers to travel through a first container exit path from the container sorting device or travel through second container exit path from the container sorting device. The accumulator may be configured to accumulate containers that traveled through the first container exit path and containers that traveled through the second container exit path. The accumulator may include an accumulator scanning device configured to scan the containers to detect the container identifiers. The accumulator may be configured to group the containers together based on the detected container identifiers and orders, and provide the grouped containers onto an accumulator output path. The packing device may be configured to package the grouped containers along with literature associated with the orders. A controller may be in communication with a database and may be configured to control movement of the containers through the material handling system, the container sorting device, the accumulator and the packing device based at least on the orders and the detected container identifiers.

An example of subject matter (such as a system, a device, apparatus or machine) for sorting containers may include a container sorting input path configured to receive a plurality of containers, and at least a first container sorting output path and a second container sorting output path. A container translation assembly may be configured to move the plurality of containers through the container sorting device. A container rotation assembly may be configured to rotate the plurality of containers moving through the container sorting device. A container imaging assembly configured to scan and detect container identifiers for the rotating plurality of containers moving through the container sorting device. The container translation assembly may be further configured to separate the plurality of containers into the first container sorting output path or the second container sorting output path based at least on the detected container identifiers and orders.

An example of subject matter (e.g. a method, a means for performing acts, or a machine-readable medium including instructions that, when performed by the machine, cause the machine to perform acts) may include receiving, at a container sorting device, a plurality of containers from a container sorting input path, sorting the plurality of containers at the container sorting device, including scanning the plurality of containers to detect container identifiers for the plurality of containers and separating the plurality of containers based on the container identifiers to travel through a first container exit path from the container sorting device or travel through second container exit path from the container sorting device, accumulating, at an accumulator, containers that traveled through the first container exit path and containers that traveled through the second container exit, including scanning the containers to detect the container identifiers, grouping the containers together based on the detected container identifiers and orders, and providing the grouped containers onto an accumulator output path from the accumulator; and packing the grouped containers along with literature associated with the orders.

An example of subject matter (e.g. a method, a means for performing acts, or a machine-readable medium including instructions that, when performed by the machine, cause the machine to perform acts) performed by a container sorting device may include receiving a plurality of containers at a container sorting input path, moving the plurality of containers through the container sorting device, rotating the containers moving the container sorting device, and detecting container identifiers for the plurality of containers by scanning the rotating plurality of containers moving through the container sorting device. Moving the plurality of containers through the container sorting device may include separating the plurality of containers into the first container sorting output path or the second container sorting output path based at least on the detected container identifiers and orders.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Generally, a prescription order or pharmaceutical order may be generated for a high-volume pharmacy, where the prescription order may include more than one prescription drug for fulfillment. For example, the prescription order may include a single prescription drug. In another example, the prescription order may include two or more prescription drugs. Each prescription drug in a prescription order may be considered to be an order component of the prescription order. Pharmaceutical orders may include orders for drugs used in multi-drug regimens. A quantity of a prescription drug (e.g. order component) may be distributed in pill bottles, containers, or other packaging. Prescription drugs may be dispensed at various sections of the high-volume pharmacy. The components of a given prescription order may be separated in time and space within the high volume pharmacy and are therefore routed to various holding areas, components, and processing areas within the high volume pharmacy so that all of the order components of a prescription order may be joined together, or "married", for packing and further processing. It is noted that a pharmaceutical order may include, in addition to the drugs used in the multi-drug regimen, other non-prescription medicines or other products that are not medicinal such as, by way of example and not limitation, bandages. These other components of the pharmaceutical order may be packaged with the drugs for the order.

Figure 1:
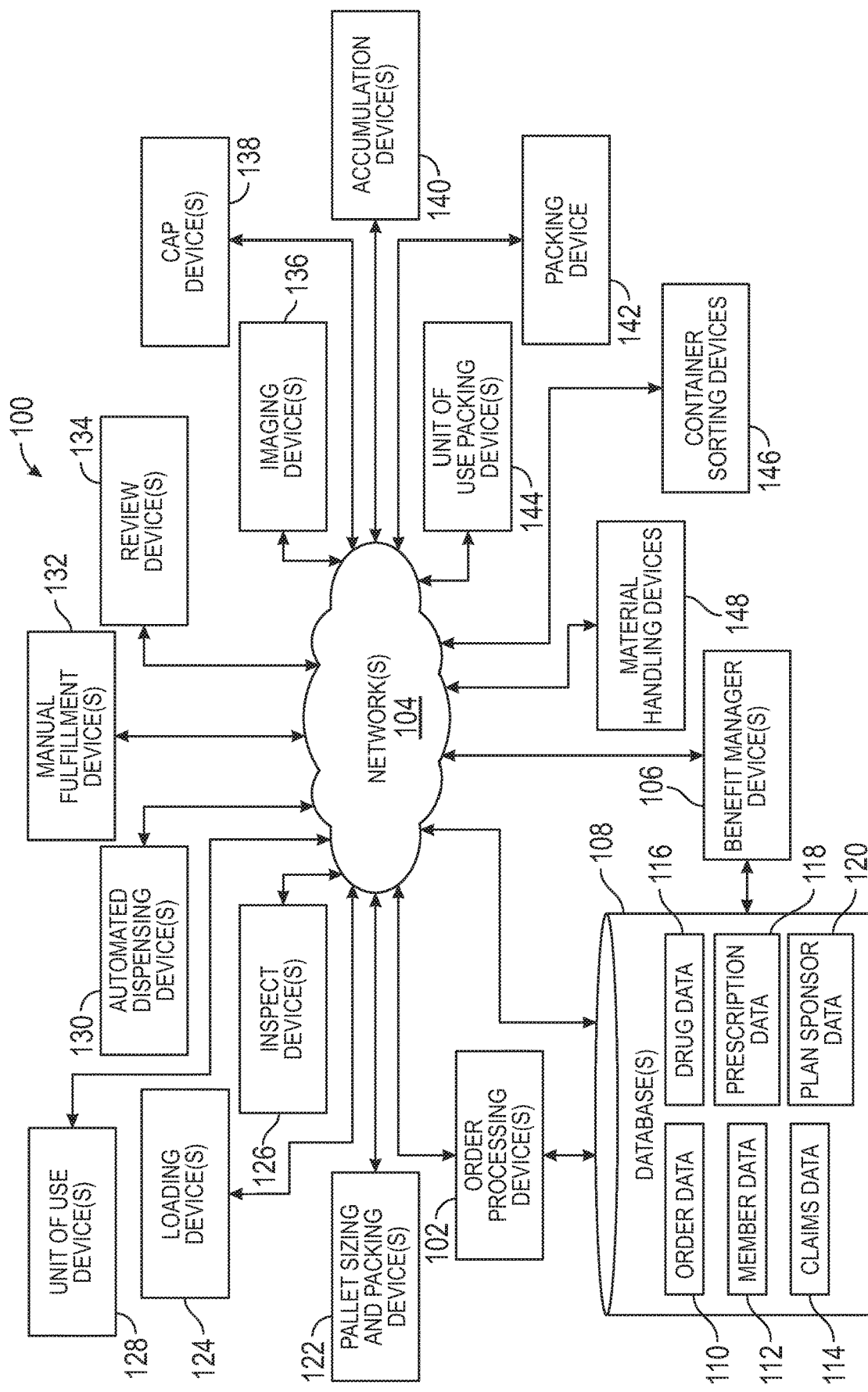
FIG. 1 illustrates, by way of example and not limitation, a block diagram of an embodiment of a pharmacy order processing system.

FIG. 1 illustrates, by way of example and not limitation, a block diagram of an embodiment of a pharmacy order processing system. While the system 100 is generally described as being deployed in a high-volume fulfillment center (e.g., a mail order pharmacy, a direct delivery pharmacy, and the like), the system 100 and/or components thereof may otherwise be deployed. The system 100 may include an order processing device 102 configured to communicate over a network 104 with a benefit manager device 106. Additional devices which may communicate over the network 104 with the benefit manager device 106 and/or the order processing device 102 may include at least some of:

database(s) 108 which may store one or more than one of order data 110, member data 112, claims data 114, drug data 116, prescription data 118, and plan sponsor data 120; pallet sizing and pucking device(s) 122 (or other cart-like devices used to transport product); loading device(s) 124; inspect device(s) 126; unit-of-use device(s) 128; automated dispensing device(s) 130; manual fulfillment device(s) 132; review device(s) 134; imaging device(s) 136; cap device(s) 138; accumulation device(s) 140; packing device(s) 142; unit-of-use packing device(s) 144, container sorting device(s) 146 configured to image and sort containers, material handling devices 148 configured to transport the containers throughout the system 100, and an order dosing filler system 150 configured to fill daily dosage unit pharmacy orders. The system 100 may also include additional devices.

The order processing device 102 may receive information about prescriptions being filled at a pharmacy in which the order processing device 102 is deployed. In general, the order processing device 102 may be a device located within or otherwise associated with a pharmacy location to enable fulfillment of a prescription by dispensing prescription drugs. In some embodiments, the order processing device 102 may be a device separate from a pharmacy that enables communication with other devices located within a pharmacy. For example, the order processing device 102 may be in communication with another order processing device 102 and/or other devices, such as other devices illustrated in FIG. 1, located with a pharmacy. In some embodiments, an external pharmacy order processing device 102 may have limited functionality (e.g., as operated by a patient requesting fulfillment of a prescription drug) when an internal pharmacy order processing device 102 may have greater functionality (e.g., as operated by a pharmacy).

The order processing device 102 may track a pharmaceutical order as it is fulfilled. A pharmaceutical order may include a prescription order for prescription medicine as well as may include non-prescription medicine and/or non-medical products. A prescription order may include one or more than one prescription to be filled by the pharmacy. The order processing device 102 may make pharmacy routing decisions and/or order consolidation decisions for a prescription order. The pharmacy routing decisions may include what device or devices in the pharmacy are responsible for filling at least a portion of the pharmaceutical order, where the order consolidation decisions include whether portions of a pharmaceutical order or multiple pharmaceutical orders should be shipped together for a patient or a patient family. The order processing device 102 may operate in combination with the benefit manager device 106.

Examples of the order processing device 102 may include a set-top box (STB), a receiver card, a mobile telephone, a personal digital assistant (PDA), a display device, a portable gaming unit, a tablet, and a computing system; however other devices may also be used. For example, the order processing device 102 may include a mobile electronic device, such an iPhone or iPad device by Apple, Inc., mobile electronic devices powered by ANDROID by Google, Inc., and a BLACKBERRY device by Blackberry Limited. The order processing device 102 may include other computing devices, such as desktop computing devices, notebook computing devices, netbook computing devices, gaming devices, and the like. The device 102 may include a processor, a memory to store data and instructions, and communication functionality. Other types of electronic devices that can use rules and instructions to execute various functions may also be used.

Examples of the network 104 include Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. The network 104 may include optical communications. The network 104 may be a local area network or a global communication network, such as the Internet. Other conventional and/or later developed wired and wireless networks may also be used. In some embodiments, the network 104 may include a prescribing network such as the electronic prescribing network operated by Surescripts of Arlington, Va.

The benefit manager device 106 may be operated by an entity at least partially responsible for creation and/or management of the pharmacy or drug benefit. The benefit manager operating the benefit manager device 106 may be a pharmacy benefit manager (PBM), or may be other entities that operate the benefit manager device 106 either on behalf of themselves, the PBM, or another entity. For example, the benefit manager may be operated by a health plan, a retail pharmacy chain, a drug wholesaler, a data analytics or other type of software-related company, or the like. In some embodiments, a PBM that provides the pharmacy benefit may also provide one or more than one additional benefits including a health benefit, a dental benefit, a vision benefit, a wellness benefit, a radiology benefit, a pet care benefit, an insurance benefit, a long term care benefit, a nursing home benefit, and the like. The PBM may, in addition to its PBM operations, operate one or more than one pharmacy. The pharmacies may be retail pharmacies, mail order pharmacies, etc.

By way of example and not limitation, a member (or a person on behalf of the member) of a pharmacy benefit plan administered by or through the PBM may attempt to obtain a prescription drug at a retail pharmacy location where the member can obtain drugs in a physical store from a pharmacist or pharmacist technician, or in some instances through mail order drug delivery from a mail order pharmacy location. The member may obtain a prescription drug directly or indirectly through the use of a machine, such as a kiosk, vending unit, mobile electronic device, or a different type of mechanical, electrical, an electronic communication device and/or computing device.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending accounts (FSA) of the member or the member's family, or the like. An employer of the member may directly or indirectly fund or reimburse the member or an account of the member for the co-pay.

The amount of the co-pay paid by the member may vary by the benefit plan of a plan sponsor or client with the PBM. The member's co-pay may be based on a flat co-pay (e.g., $10), co-insurance (e.g., 10%), and/or a deductible (e.g., for first $500 of annual prescription drug spend) for certain prescription drugs, certain types of prescription drugs, and/or all prescription drugs. In certain instances, the member may not pay the co-pay or may only pay for a portion of a co-pay for a prescription drug. For example, if the usual and customary cost for a generic version of a prescription drug is $4, and the member's flat co-pay is $20 for the prescription drug, the member may only pay $4 to receive the prescription drug. In another example involving a worker's compensation claim, no co-pay may be due by the member for the prescription drug. The co-pay may also vary based on the channel used to receive the prescription drug. For example, the co-pay for receiving prescription drugs from a mail order pharmacy location may be less than the co-pay for receiving prescription drugs from a retail pharmacy location.

In conjunction with receiving the co-pay (if any) from the member and dispensing the prescription drug to the member, the pharmacy submits a claim to the PBM for the prescription drug. The PBM may perform certain adjudication operations including verifying the eligibility of the member, reviewing the formulary of the member to determine appropriate co-pay, coinsurance, and deductible for the prescription drug, and performing a drug utilization review (DUR) on the member. The PBM then provides a response to the pharmacy following performance of at least some of the aforementioned operations. As part of the adjudication, the plan sponsor (or the PBM on behalf of the plan sponsor) ultimately reimburses the pharmacy for filling the prescription drug when the prescription drug was successfully adjudicated. The aforementioned adjudication operations generally occur before the co-pay is received and the prescription drug dispensed. However, the operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be based at least in part on the type of pharmacy network in which the pharmacy is included. Other factors may be used to determine the amount in addition to the type of pharmacy network. For example, if the member pays the pharmacy for the prescription without using the prescription drug benefit provided by the benefit manager, the amount of money paid by the member may be higher and the amount of money received by the pharmacy for dispensing the prescription drug and for the prescription drug itself may be higher. Some or all of the foregoing operations may be performed by executing instructions on the benefit manager device 106 and/or an additional device.

In some embodiments, at least some of the functionality of the order processing device 102 may be included in the benefit manager device 106. The order processing device 102 may be in a client-server relationship with the benefit manager device 106, a peer-to-peer relationship with the benefit manager device 106, or in a different type of relationship with the benefit manager device 106.

The order processing device 102 and/or the benefit manager device 106 may be in communication directly (e.g., through local storage) and/or through the network 104 (e.g., in a cloud configuration or software as a service) with a database 108 (e.g., as may be retained in memory or otherwise). The database 108 may store order data 110, member data 112, claims data 114, drug data 116, prescription data 118, and/or plan sponsor data 120. Other data may be stored in the database 108.

The order data 110 may include data related to the order of prescriptions including the type (e.g., drug name and strength) and quantity of each prescription in a prescription order. The order data 110 may also include data used for completion of the prescription, such as prescription materials. Prescription materials may be a type of order materials that include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, or the like. The order data 110 may be used by a high-volume fulfillment center to fulfill a pharmacy order.

In some embodiments, the order data 110 may include verification information associated with fulfillment of the prescription in the pharmacy. For example, the order data 110 may include videos and/or images taken of: the prescription drug prior to dispensing, during dispensing, and/or after dispensing; a prescription container (e.g., a prescription bottle and sealing lid) used to contain the prescription drug prior to dispensing, during dispensing, and/or after dispensing; the packaging and/or packaging materials used to ship or otherwise deliver the prescription drug prior to dispensing, during dispensing, and/or after dispensing; and/or the fulfillment process within the pharmacy. Other type of verification information such as bar code data read from pallets used to transport prescriptions within the pharmacy may also be stored as order data 110.

The member data 112 includes information regarding the members associated with the benefit manager. Examples of the member data 112 include name, address, telephone number, e-mail address, prescription drug history, and the like. The member data 112 may include a plan sponsor identifier that identifies the plan sponsor associated with the member and/or a member identifier that identifies the member to the plan sponsor. The member data 112 may include a member identifier that identifies the plan sponsor associated with the patient and/or a patient identifier that identifies the patient to the plan sponsor. The member data 112 may also include, by way of example, dispensation preferences such as type of label, type of cap, message preferences, language preferences, or the like.

The member data 112 may be accessed by various devices in the pharmacy, e.g., the high-volume fulfillment center, to obtain information utilized for fulfillment and shipping of prescription orders. In some embodiments, an external order processing device 102 operated by or on behalf of a member may have access to at least a portion of the member data 112 for review, verification, or other purposes.

In some embodiments, the member data 112 may include information for persons who are patients of the pharmacy but are not members in a benefit plan being provided by the benefit manager. For example, these patients may obtain drug directly from the pharmacy, through a private label service offered by the pharmacy, the high-volume fulfillment center, or otherwise. In general, the use of the terms member and patient may be used interchangeably herein.

The claims data 114 includes information regarding pharmacy claims adjudicated by the PBM under a drug benefit program provided by the PBM for one, or more than one, plan sponsors. In general, the claims data 114 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility. Additional information may be included.

In some embodiments, other types of claims beyond prescription drug claims may be stored in the claims data 114. For example, medical claims, dental claims, wellness claims, or other type of health care-related claims for members may be stored as a portion of the claims data 114.

In some embodiments, the claims data 114 includes claims that identify the members with whom the claims are associated. In some embodiments, the claims data 114 includes claims that have been de-identified (e.g., associated with a unique identifier but not with a particular, identifiable member).

The drug data 116 may include drug name (e.g., technical name and/or common name), other names by which the drug is known by, active ingredients, an image of the drug (e.g., in pill form), and the like. The drug data 116 may include information associated with a single medication or multiple medications.

The prescription data 118 may include information regarding prescriptions that may be issued by prescribers on behalf of patients, who may be members of the drug benefit plan, for example to be filled by a pharmacy. Examples of the prescription data 118 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 110 may be linked to associated member data 112, claims data 114, drug data 116, and/or prescription data 118.

The plan sponsor data 120 includes information regarding the plan sponsors of the benefit manager. Examples of the plan sponsor data 120 include company name, company address, contact name, contact telephone number, contact e-mail address, and the like.

The order processing device 102 may direct at least some of the operations of the devices illustrated in FIG. 1. In some embodiments, operations performed by one of these devices may be performed sequentially, or in parallel with the operations of another device as may be coordinated by the order processing device 102. In some embodiments, the order processing device 102 tracks a prescription with the pharmacy based on operations performed by one or more of the devices illustrated in FIG. 1.

A material transport system or assembly may be used to transport product. For example, conveyors may include gravity conveyors or powered conveyors. Powered conveyors may include but are not limited chain-driven conveyors, pallet conveyors and servo-controlled conveyors. Intelligent conveyor systems may be designed to control the speed and/or direction of lines of article motion, and may allow individual articles to be inserted or removed from the line. Intelligent conveyor system may be designed to enable electronic movement control of individual transport mechanisms (e.g. pucks) for the product. For example, conveyor systems may be designed with one or more servo motors, controlled by a programmable servo controller, to electronically control movement of an individual puck. An example of an intelligent system may move individual carts, with or without a puck in or otherwise connected to the cart, along rails, under electronic control, in order to enable individual articles to be inserted and/or removed from line(s) of articles. Material transport systems may include a rotating structure with a periphery. Objects may be on a surface near the periphery such that they move as the structure rotates. Other material transport systems may be used. The material transport system may include combinations of different types of material transport systems, such as combinations of two or more of a gravity conveyor, a power conveyor, and an intelligent conveyor.

In some embodiments, by way of example, the system 100 may transport product such as prescription drug containers (e.g., between or among devices, such as one or more devices illustrated in FIG. 1, in the high-volume fulfillment center) by use of pallets. The pallet sizing and pucking device 122 may configure pucks in a pallet. A pallet may be a transport structure for a number of the prescription containers 101, and may include a number of cavities. A puck may be placed in one or more than one of the cavities in a pallet by the pallet sizing and pucking device 122. A puck may include a receptacle sized and shaped to receive a prescription container 101. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 102 based on prescriptions which the order processing device 102 decides to launch. In general, prescription orders in the storage device 108 reside in one or more than one queues, and are generally launched in a first-in-first-out order. However, the order processing device 102 may use logic and a variety of factors to determine when and how prescriptions are to be launched. For example, some non-limiting factors which may alter the first-in-first-out order of launching prescriptions in a pharmacy include the age of the order, whether the order required an outreach to a physician or some other intervention, whether there are any performance guarantees with plan sponsors or members, the available inventory of a given pharmaceutical in view of existing prescriptions already launched which will require that pharmaceutical, the zip code to which the order will be shipped, the workload and volume of various parts of the pharmacy, whether valid paperwork for the order has been received, and/or similar orders for the same pharmaceutical that are already to be launched. The logic may be implemented directly in the pallet sizing and pucking device 122, in the order processing device 102, in both devices 102, 122, or otherwise. Once a prescription is set to be launched, a puck suitable for the appropriate size of container for that prescription may be positioned in a pallet by a robotic arm or pickers. The pallet sizing and pucking device 122 may launch a pallet once pucks have been configured in the pallet.

The loading device 124 may load prescription containers into the pucks on a pallet by a robotic arm, pick and place mechanism, or the like. In one embodiment, the loading device 108 has robotic arms or pickers to grasp a prescription container and move it to and from a pallet or a puck. The loading device 124 may also print a label which is appropriate for a container that is to be loaded onto the pallet, and apply the label to the container 101. The pallet may be located on a conveyor assembly during these operations, e.g., at the high-volume fulfillment center.

The inspect device 126 may verify that containers are correctly labeled and positioned on a material transport system. For example, the inspect device 126 may verify that containers in a pallet are in correct spots on the pallet. The inspect device 126 may scan the label on one or more than one container on the pallet. Labels of the containers may be scanned or imaged in full or in part by the inspect device 126. Such imaging may occur after the container has been lifted out of its puck by a robotic arm, picker, or the like, or may be otherwise scanned or imaged while retained in the puck. In some embodiments, images and/or video captured by the inspect device 126 may be stored in the database 108 as order data 110.

The unit-of-use device 128 may temporarily store, monitor, label and/or dispense unit-of-use products. In general, unit-of-use products are prescription drug products that may be delivered to a patient or member without being repackaged at the pharmacy. These products may include pills in a container 101, pills in a blister pack, inhalers, and the like. Prescription drug products dispensed by the unit-of-use device 128 in their original packaging may be packaged individually or collectively for shipping, or may be shipped in combination with other prescription drugs dispenses by other devices in the high-volume fulfillment center.

The automated dispensing device 130 may include one or more than one device that dispense prescription drugs or pharmaceuticals into prescription containers in accordance with one or multiple prescription orders. In general, the automated dispensing device 130 may include mechanical and electronic components with, in some embodiments, software and/or logic to facilitate pharmaceutical dispensing that would otherwise be performed in a manual fashion by a pharmacist and/or pharmacist technician. For example, the automated dispensing device 130 may include high volume fillers that fill a number of prescription drug types at a rapid rate and blister pack machines that dispense and pack drugs into a blister pack. Prescription drugs dispensed by the automated dispensing devices 130 may be packaged individually or collectively for shipping, or may be shipped in combination with other prescription drugs dispenses by other devices in the high-volume fulfillment center.

The manual fulfillment device 132 may provide for manually fulfillment of prescriptions. For example, the manual fulfillment device 132 may receive or obtain a container and enable fulfillment of the container by a pharmacist or pharmacy technician. In some embodiments, the manual fulfillment device 132 provides the filled container to another device in the system 100 to be joined with other containers in a prescription order for a patient or member. In general, a manual fulfillment may include operations at least partially performed by a pharmacist or pharmacy technician. For example, a person may retrieve a supply of the prescribed drug, may make an observation, may count out a prescribed quantity of drugs and place them into a prescription container 101, or the like. Some portions of the manual fulfillment process may be automated by use of a machine. For example, counting of capsules, tablets, or pills may be at least partially automated (e.g., through use of a pill counter). Prescription drugs dispensed by the manual fulfillment device 132 may be packaged individually or collectively for shipping, or may be shipped in combination with other prescription drugs dispenses by other devices in the high-volume fulfillment center.

The review device 134 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 134 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like.

The imaging device 136 may image containers once they have been filled with pharmaceuticals. The imaging device 136 may measure the fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 102, and/or stored in the database 110 as part of the order data 110.

The cap device 138 may be used to cap or otherwise seal a prescription container 101. In some embodiments, the cap device 138 may secure a prescription container with a type of cap in accordance with a patient preference (e.g., a preference regarding child resistance), a plan sponsor preference, a prescriber preference, or the like. The cap device 138 may also etch a message into the cap, although this process may be performed by a subsequent device in the high-volume fulfillment center. The cap may include an induction liner. After the cap with the induction liner is placed on the container, an induction sealer may heat the induction liner such that the induction liner forms a tamper-evident seal over the container.

The accumulation device 140 may be used to accumulate containers, including one or more types of containers, of prescription drugs in a prescription order. The accumulation device 140 may accumulate prescription containers from various devices or areas of the pharmacy. For example, the accumulation device 140 may accumulate prescription containers from the unit-of-use device 128, the automated dispensing device 130, the manual fulfillment device 132, and the review device 134, at the high-volume fulfillment center. The accumulation device 140 may be used to group the prescription containers prior to shipment to the member or otherwise.

The packing device 142 may be configured to package a prescription order in preparation for shipping the order. For example, the packing device 142 may box, bag, or otherwise package the fulfilled prescription order for delivery. The packing device 142 may further place inserts into the packaging. For example, bulk prescription orders may be shipped in a box, while other prescription orders may be shipped in a bag which may be a wrap seal bag. The packing device 142 may label the box or bag with the address and a recipient's name. The packing device 142 may sort the box or bag for mailing in an efficient manner (e.g., sort by delivery address). The packing device 142 may include ice or temperature sensitive elements for prescriptions which are to be kept within a temperature range during shipping in order to retain efficacy or otherwise. The package may then be shipped through postal mail, through a mail order delivery service that ships via group and/or air (e.g., UPS, FedEx, or DHL), through delivery service, through a locker box at a shipping site (e.g., Amazon locker or a PO Box), or otherwise.

The unit-of-use packing device 144 may be configured to package a unit-of-use prescription order in preparation for shipping the order. The unit-of-use packing device 144 may include manual scanning of containers to be bagged for shipping to verify each container in the order.

The devices illustrated in FIG. 1 may be separate device or combined. When multiple devices are present, the multiple devices may be of the same device type or models or may be a different device type or model.

Moreover, the system 100 shows a single network 104; however, multiple networks can be used. The multiple networks may communicate in series with each other to link the devices or in parallel to link the devices. Multiple devices may share processing and/or memory resources. The devices may be located in the same area or in different locations. For example, the devices may be located in a building or set of adjoining buildings. They may be interconnected (e.g. by conveyors), networked, and/or otherwise in contact with one another or integrated with one another, e.g., at the high-volume fulfillment center. In addition, the functionality of a device may be split among a number of discrete devices and/or combined with other devices.

Figure 2:
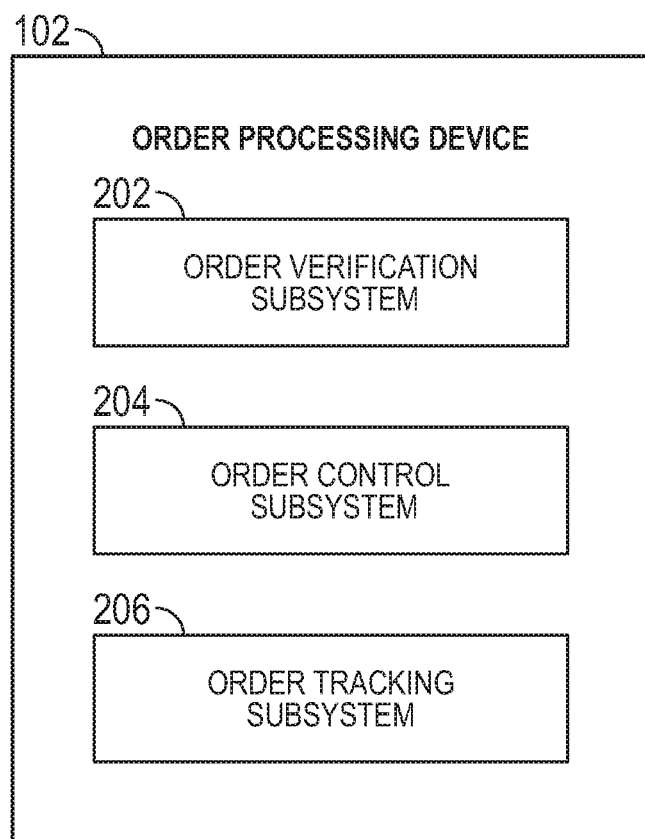
FIG. 2 illustrates, by way of example and not limitation, a block diagram of an embodiment of an order processing device that may be deployed within an order processing system such as the system of FIG. 1.

FIG. 2 illustrates, by way of example and not limitation, a block diagram of an embodiment of an order processing device that may be deployed within an order processing system such as the system of FIG. 1. The order processing device 102 may be used by one or more than one operator to generate pharmaceutical orders (e.g. prescription orders), make routing decisions, make order consolidation decisions, and/or view order status and other order related information. For example, the pharmaceutical order may be comprised of order components. The order processing device 102 may receive instructions to fulfill an order without operator intervention. An order component may include a prescription drug fulfilled by use of a container through the system 100. The order processing device 102 may direct an order component to the manual fulfillment device 132 and/or to the review device 134, and direct other components to the automated dispensing device 130. The order processing device 102 may direct order components to the accumulation device 140 for aggregation before shipping. The order processing device 102 may direct the order components directly to the packing device 142 if the prescription order does not require accumulation from various areas of the pharmacy for completion. The order processing device 102 may be deployed in the system 100, or may otherwise be used.

The order processing device 102 may include an order verification subsystem 202, an order control subsystem 204, and/or an order tracking subsystem 206. Other subsystems may also be included in the order processing device 102.

The order verification subsystem 202 may communicate with the benefit manager device 106 to, verify the eligibility of the member, review the formulary to determine appropriate co-pay, coinsurance, and deductible for the prescription drug, and/or perform a DUR. Other communications between the order verification subsystem 202 and the benefit manager device 106 may be performed for a variety of purposes.

The order control subsystem 204 controls various movements of the containers and/or pallets along with various filling functions during their progression through the system 100. In some embodiments, the order control subsystem 204 may identify a prescribed drug in one or more than one prescription order as capable of being fulfilled by the automated dispensing device 130. The order control subsystem 204 may determine which prescriptions are to be launched, and may determine that a pallet of automated-fill containers is to be launched. The order control subsystem 204 may determine that an automated-fill prescription of a specific pharmaceutical is to be launched, and may examine a queue of orders awaiting fulfillment for other prescription orders which will be filled with the same pharmaceutical. The order control subsystem 204 may then launch orders with similar automated-fill pharmaceutical needs together in a pallet to the automated dispensing device 130. As the devices may be interconnected by a system of one or more conveyors or other container movement systems, the order control subsystem 204 may control various conveyors to deliver the pallet from the loading device 124 to the manual fulfillment device 132, for example.

The order tracking subsystem 206 may track a prescription order as it progresses through (or stops at) various stations toward fulfillment. The order tracking subsystem 206 may track, record and/or update order history, order status or the like. The order tracking subsystem 206 may store data locally (e.g., in a memory) or as a portion of the order data 110 stored in the storage device 108.

The order processing device 102 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The order processing device 102 may be utilized by the pharmacy to submit the claim to the PBM for adjudication.

Additionally, in some embodiments, the order processing device 102 may enable information exchange between the pharmacy and the PBM, for example, to allow the sharing of member information such as drug history, and the like, that may allow the pharmacy to better service a member (e.g., by providing more informed therapy consultation and drug interaction information, etc.). In some embodiments, the benefit manager device 106 may track prescription drug fulfillment and/or other information for patients that are not members or have not identified themselves as members, at the time (or in conjunction with the time) in which they seek to have a prescription filled at a pharmacy.

The order processing device 102 may also track and/or schedule literature or paperwork associated with each prescription order or multiple prescription orders that are being shipped together.

The order processing device 102 may include circuitry, a processor, a memory to store data and instructions, and communication functionality. The order processing device 102 is dedicated to performing processes, methods and/or instructions described herein. Other types of electronic devices specifically configured to implement with the processes, methods and/or instructions described herein may also be used.

The storage device 108 may include: a non-transitory storage (e.g., memory, hard disk, CD-ROM, etc.) in communication with the benefit manager device 106, and/or the order processing device 102 directly and/or over the network 104. The non-transitory storage may store order data 110, member data 112, claims data 114, drug data 116, prescription data 118, and/or plan sponsor data 120. Further, the pharmacy order processing system 100 includes additional devices, including at least one container disassembly workstation 125, tray delivery conveyors 124, picking workstations 126, inspection workstations 130, packing delivery conveyors 132, packing workstations 134, and shipping conveyors 136, each additional device able to communicate with each other directly or over the network 104.

Figure 3:
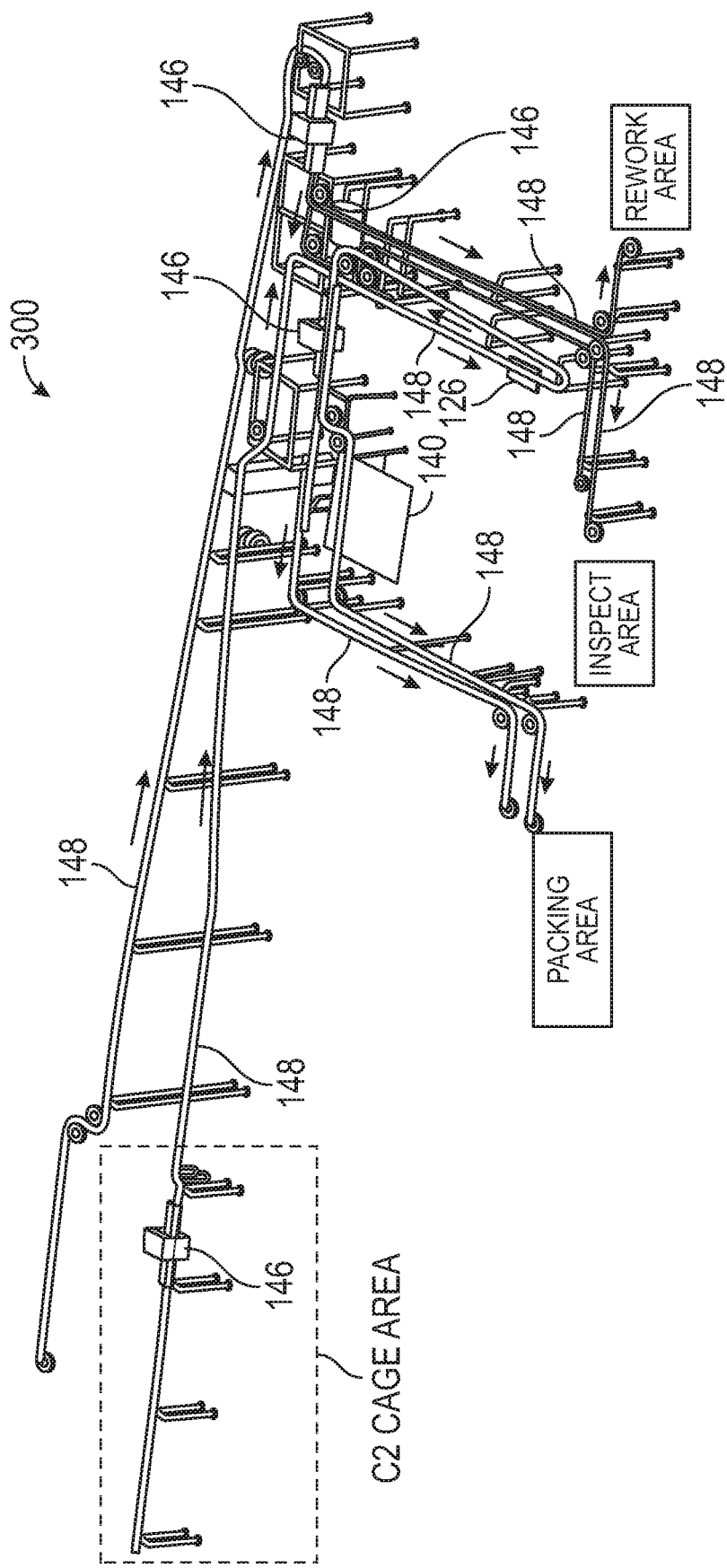
FIG. 3 illustrates, by way of example and not limitation, an embodiment of a portion of a pharmacy order processing system such as the system of FIG. 1.

FIG. 3 illustrates, by way of example and not limitation, an embodiment of a product selection order filling system that may be deployed within a pharmacy order processing system such as the system of FIG. 1. The figure illustrates a "controls cage". In this embodiment, the controls cage is a more restricted or controlled-access portion of the pharmacy order processing system 100 separate from other portions of the pharmacy order processing system 100. The controls cage is adapted to rapidly process, at least a portion of pharmacy orders that include controlled substances having a C2, C3, C4, or C5 classification, in at least some cases from receipt of an order to shipping a packed filled order. In this embodiment, the controls cage is separate from the non-controlled substance portion of the pharmacy order processing system 100 and includes a separate C2 cage area for processing C2 substances. In other embodiments, the controls cage is substantially continuous with the non-controlled substance portion of the pharmacy order processing system 100.

There are generally two levels of security within the controls cage. First the C3-05 substances are in the general controls area that has wire mesh security feature within the walls of the controls room proper. Within this general controls area are multiples of security cameras and a human security guard located outside of the cage that controls and documents who enters and leaves the controls cage. A second level of security, the C2 substance area, is within the general control area and includes an additional wire mesh cage that separates the C2 area from the C3-05 substances area due to the narcotics within that area. Pharmacy orders that include C2 substances have to be verified by two pharmacists, while pharmacy orders that include C3-05 substances can be verified by a pharmacist and RPh technician. In addition, packages from C3-C5 area can be loaded on the mail manifest system in a sporadic fashion, as long as they are not easily identifiable from non-controlled packages. Packages containing C2 substances can only leave the controls cage after being reconciled pill for pill every 24 hours before they reach the mail truck and are also security escorted from the cage to the truck and do not enter the normal flow of manifested orders.

In the example embodiment, the portion of the pharmacy order processing system 300 illustrated in FIG. 3 includes an accumulation device 140, an inspect device 126, four container sorting devices 146, a packing device 142 and multiple material handling devices 148 extending between at least one of the accumulation device 140, the inspect device 126, the container sorting devices 146, the packing device 142, a packing area, an inspect area, and a rework area. If a container 101 is flagged for a routine check it will go the rework area from the container sorting device 146. Other reasons for transferring a container 101 to the rework area may include a low count, underweight from the scale, inspect, capper, image issues, along with an additional inspection from the manual fill areas or the controls cage. The inspect device 126 is a may be a scale configured to weigh the containers 101. In other embodiments, the controls cage may include any number of the accumulation devices 140, the inspect devices 126, the container sorting devices 146, the packing devices 142, and the material handling devices 148 arranged in any configuration that facilitates operation of the pharmacy order processing system 100 as described herein. More specifically, in one non-limiting example, one material handling device elevates the containers 101 up to the required height so they can travel underneath the cat-walk. The containers then follow the elevated cat-walk to the ceiling area of the controls cage, where they lower down to chest level. While the containers 101 are elevated they are also inaccessible for purposes of security. Outside of the controls cage they start to transition down into the outside wall of the controls cage. Generally, one of each of the devices 126, 140, 142, 146, 148 may be included in the pharmacy order processing system 300, multiple of each of the devices 126, 140, 142, 146, 148 may be included in the pharmacy order processing system 300, or some of the devices 126, 140, 142, 146, 148 may have only one device in the pharmacy order processing system 300 and some of the devices 126, 140, 142, 146, 148 may have more than one device in the pharmacy order processing system 300.

Figure 4:
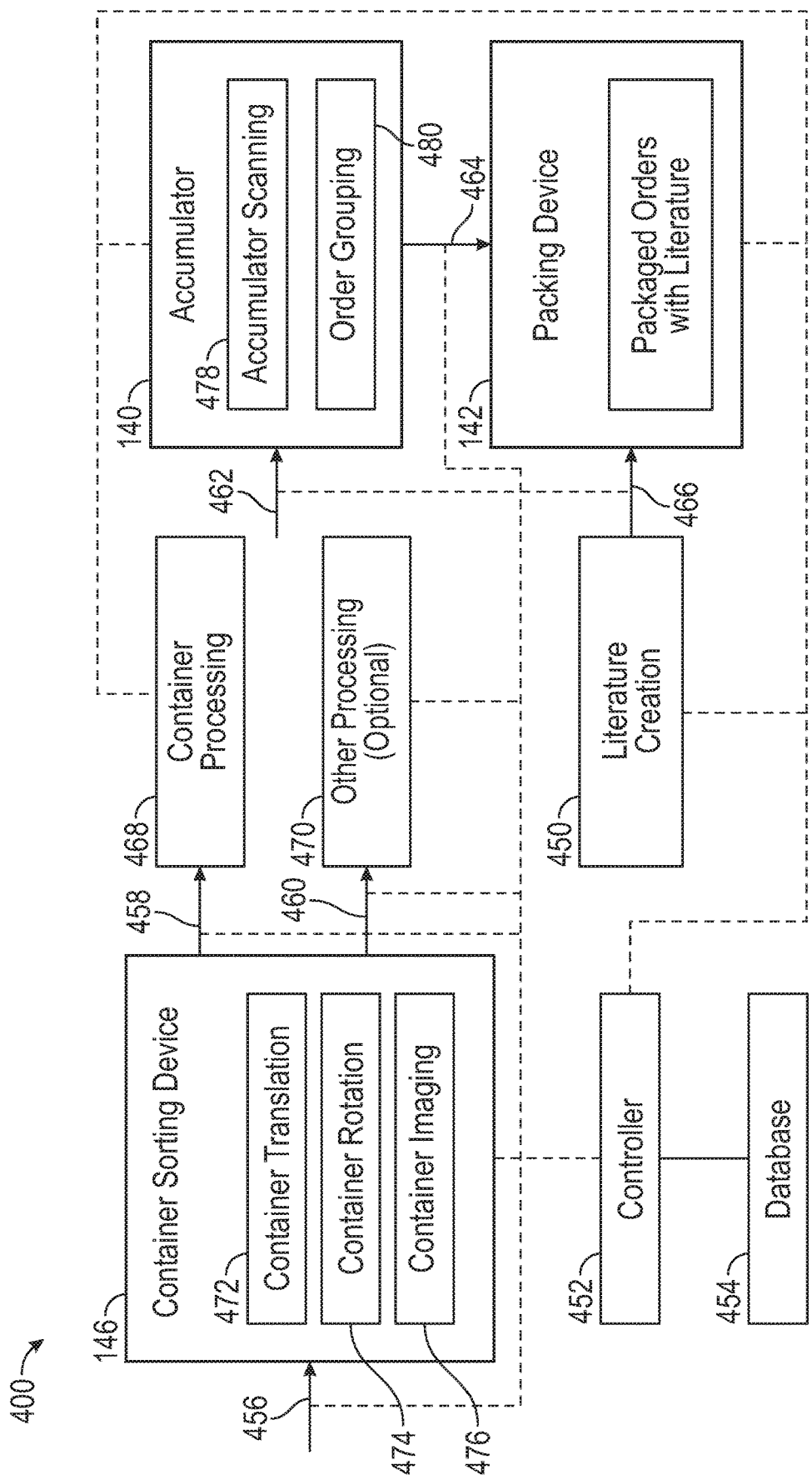
FIG. 4 illustrates, by way of example and not limitation, a block diagram of at least a portion of an order processing system used to sort containers into different paths, accumulate containers, and provide grouped containers for packaging with literature associated with grouped containers.

FIG. 4 illustrates, by way of example and not limitation, a block diagram of at least a portion of an order processing system 400 used to sort containers into different paths, accumulate containers, and provide grouped containers for packaging with literature associated with grouped containers. The order processing system 400 may include a material handling system, a container sorting device 146, an accumulation device or accumulator 140, a packing device 142, a literature creation device 450, a controller 452 (e.g. central controller or distributed controller) and database 454 which may but does not necessary correspond to the database 108 illustrated in FIG. 1. A central controller may provide processing and memory resources shared by multiple devices. A distributed controller may split the functionality of the controller over more than one device throughout the system. The material handling system 148 may be configured to move a plurality of containers through a plurality of container paths. The plurality of container paths may include a container sorting input path 456, a first container sorting output path 458, a second container sorting output path 460, at least one accumulator input path 462, an accumulator output path 464, and a literature path 466. The container sorting device 146 may be configured to receive the plurality of containers from the container sorting input path 456 of the material handling system 148, scan the plurality of containers to detect container identifiers for the plurality of containers, and separate the containers based on the container identifiers to travel through a first container exit path 458 from the container sorting device 146 or travel through second container exit path 460 from the container sorting device 146. The accumulator 140 may be configured to accumulate containers that traveled through the first container exit path 458 and containers that traveled through the second container exit path 460. The accumulator 140 may include an accumulator scanning device configured to scan the containers to detect the container identifiers. The accumulator 140 may be configured to group the containers together based on the detected container identifiers and orders, and provide the grouped containers onto an accumulator output path. The packing device 142 may be configured to package the grouped containers along with literature associated with the orders. The literature may be created by the literature creation device 450 and presented to the packing device 142 via the literature path 466. The controller 452 may be in communication with the database 454 and may be configured to control, illustrated via dotted lines, movement of the containers through the material handling system, the container sorting device, the accumulator and the packing device based at least on the orders and the detected container identifiers.

In various embodiments, the containers that travel through the first container exit path 458 may travel through different processing stations 468 than the containers that travel through the second container output path 460 which may optionally travel to other processing stations 470. For example, the containers that travel through the first container exit path 458 may travel through a control cage portion of an order processing station before traveling to the accumulator 140, where the containers that travel through the second container exit path 460 do not travel through the control cage portion of an order processing station before traveling to the accumulator 140. The containers that travel through the first container exit path 458 may travel through a manual fulfillment area of an order processing station before traveling to the accumulator 140, where the containers that travel through the second container exit path 460 do not travel through the manual fulfillment area of an order processing station before traveling to the accumulator 140. The containers that travel through the first container exit path 458 may travel through an inspect area of an order processing station before traveling to the accumulator 140, where the containers that travel through the second container exit path 460 do not travel through the inspect area of an order processing station before traveling to the accumulator 140. The containers that travel through the first container exit path 458 may travel through a rework area of an order processing station before traveling to the accumulator 140, where the containers that travel through the second container exit path 460 do not travel through the rework area of an order processing station before traveling to the accumulator 140.

The container sorting device 146 may be configured to rotate each individual container of the plurality of containers when scanning the individual container to detect a machine-readable identifier on the containers. Examples of machine-readable identifiers include, but are not limited to, bar codes, Quick Response (QR) codes, Radio Frequency Identification (RFID), Optical Character Recognition (OCR), and the like. The rotation of the container may be useful in enabling the scanner to read the identifier on the container. The container sorting device 146 may include a container translation system 472 for moving containers, a container rotation device 474 for rotating the moving containers, and a container imaging system 476 for scanning or otherwise imaging container identifiers on the container. For example, the container sorting device may include as illustrated and discussed with respect to FIGS. 8-13, a star wheel 338 having container recesses 340 configured to receive containers from the plurality of containers. The star wheel may be configured to rotate to move individual ones of the containers with individual ones of the container recesses. Each of the container recesses including a plurality of rollers 342 configured to facilitate rotation of the containers in the container recesses. A container interface 344 may be configured to contact at least one of the containers in the container recesses. A container interface drive 346 may be configured to rotate the container interface such that the at least one of the containers is caused to rotate in a respective one of the container recesses. The accumulator 140 may provide functions that include accumulator scanning functions 478 and order grouping functions 480. With references to FIGS. 14-16, the accumulator 140 may include a container manipulator device 430 configured to manipulate individual ones of the containers to improve detection of the container identifiers. The container manipulation device may be configured to grasp and move individual ones of the containers from the accumulator scanning device to known locations based on the detected container identifier for the individual ones of the containers. The accumulator 140 may include a container manipulator device configured to grasp and move at least one container from known locations in the plurality of accumulation areas into a container group based on the orders. Thus, the accumulator may function to receive and store one or more containers for component(s) of an order. Once all of the containers for the order have been received, the accumulator may then retrieve those containers from known locations to provide a container group for the order ready for packaging.

It is noted that more than one container sorting device may be cascaded within a system to provide multiple container paths such as may be useful to provide unique processing for various components of the orders. Similarly, more than one accumulator may be cascaded to group together subcomponents of an order for further grouping by other accumulator(s) in the system.

Figure 5:
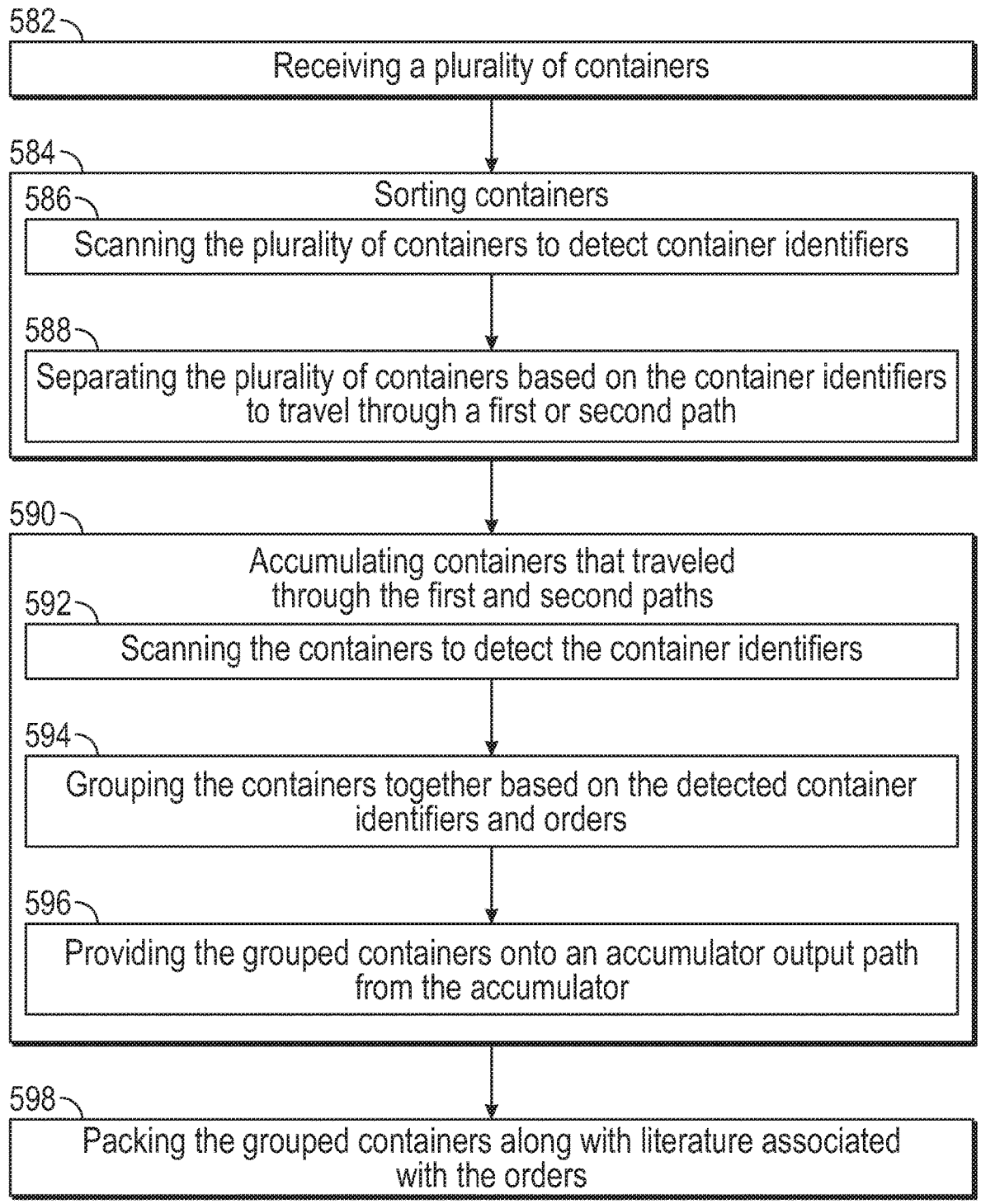
FIG. 5 illustrates, by way of example and not limitation, a method for sorting, accumulating and packaging containers such as may be performed using the order processing system illustrated in FIG. 4.

FIG. 5 illustrates, by way of example and not limitation, a method for sorting, accumulating and packaging containers such as may be performed using the order processing system illustrated in FIG. 4. At 582, a plurality of containers from a container sorting input path may be received at a container sorting device. At 584 the plurality of containers may be sorted at the container sorting device. Sorting 584 may include scanning 586 the plurality of containers to detect container identifiers for the plurality of containers and separating 588 the plurality of containers based on the container identifiers to travel through a first container exit path from the container sorting device or travel through second container exit path from the container sorting device. The method may further include at 590 accumulating, at an accumulator, containers that traveled through the first container exit path and containers that traveled through the second container exit. Accumulating 590 may include scanning 592 the containers to detect the container identifiers, grouping 594 the containers together based on the detected container identifiers and orders, and providing 596 the grouped containers onto an accumulator output path from the accumulator. The method may further include packing 598 the grouped containers along with literature associated with the orders.

Figure 6:
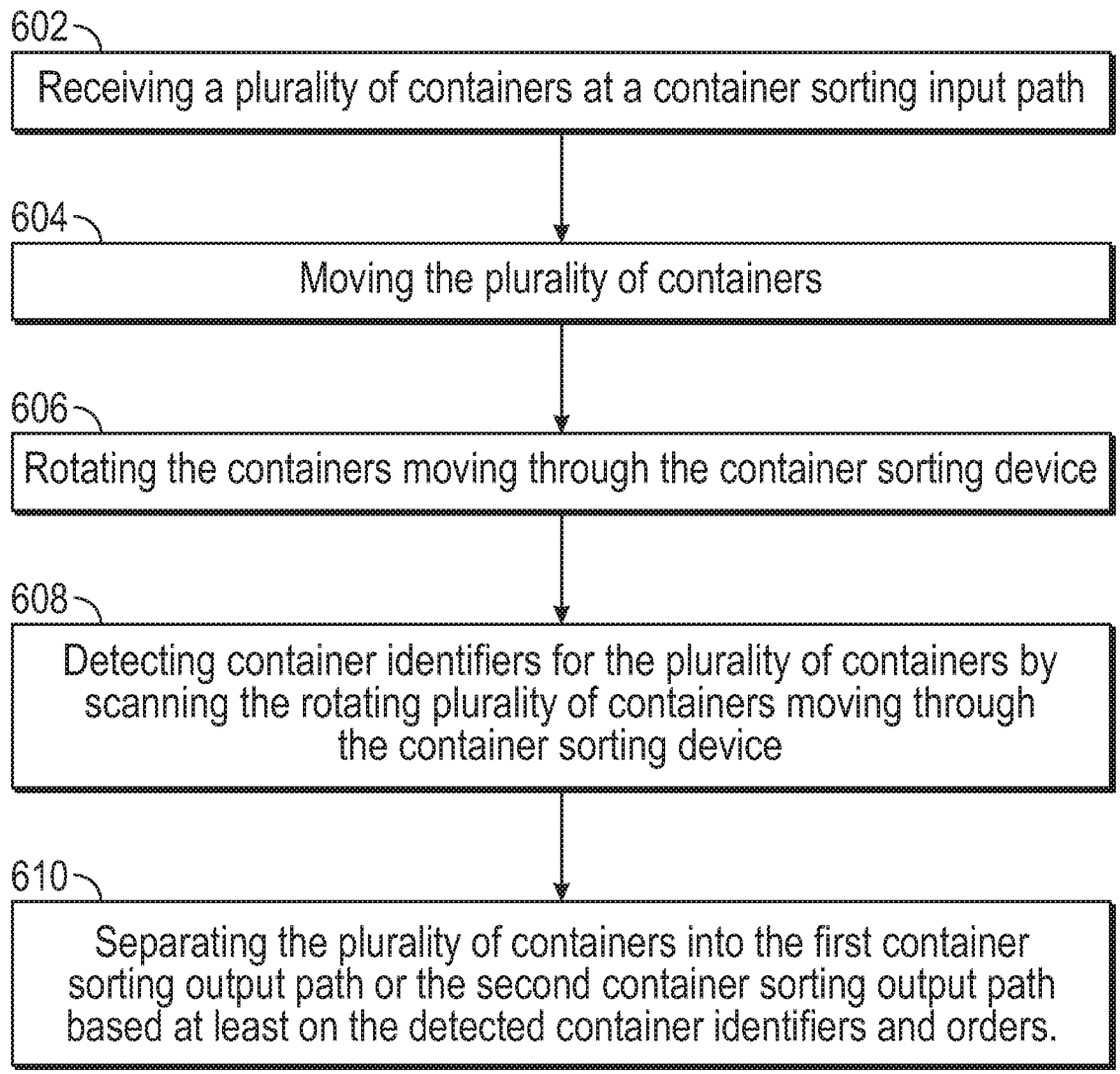
FIG. 6 illustrates, by way of example and not limitation, a method for sorting containers such as may be performed by the container sorting device in the order processing system illustrated in FIG. 4

FIG. 6 illustrates, by way of example and not limitation, a method for sorting containers such as may be performed by the container sorting device 146 in the order processing system 400 illustrated in FIG. 4. At 602 a plurality of containers may be received at a container sorting input path. At 604 the plurality of containers may be moved through the container sorting device. At 606, the containers that are moving in the container sorting device may be rotated. At 608 container identifiers for the plurality of containers may be detected (e.g. reading machine-readable identifiers) by scanning the rotating plurality of containers moving through the container sorting device. At 610 the method may include separating the plurality of containers into the first container sorting output path or the second container sorting output path based at least on the detected container identifiers and orders. Moving the plurality of containers through the container sorting device at 604 may include moving the containers in a manner to separate 610 the plurality of containers into the first container sorting output path or the second container sorting output path based at least on the detected container identifiers and orders.

Figure 7:
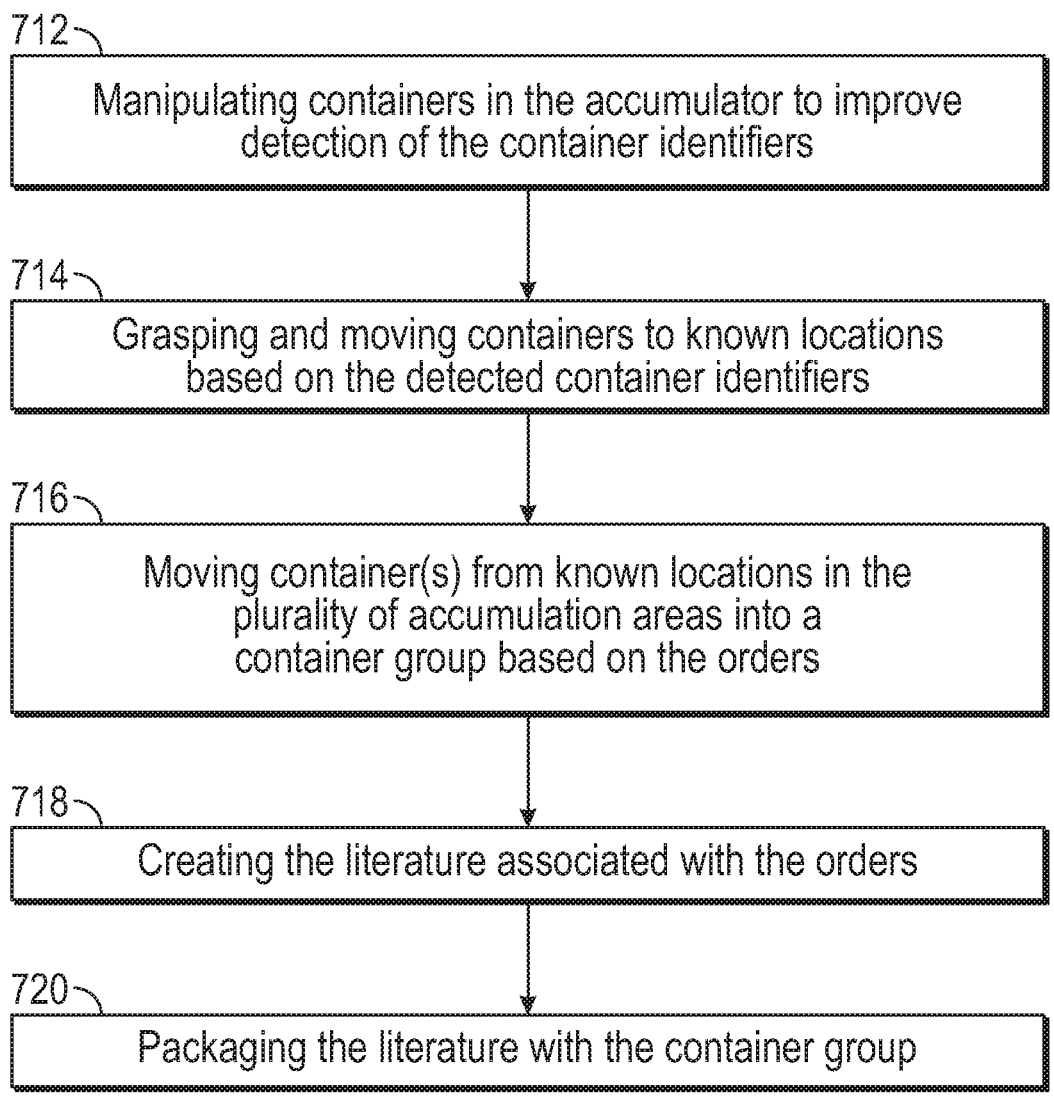
FIG. 7 illustrates, by way of example and not limitation, a method for accumulating containers, providing grouped containers and packaging literature with the container group such as may be performed using the accumulator, the literature creation device and the packing device illustrated in FIG. 4.

FIG. 7 illustrates, by way of example and not limitation, a method for accumulating containers, providing grouped containers and packaging literature with the container group such as may be performed using the accumulator 140, the literature creation device 450 and the packing device 152 illustrated in FIG. 4. At 712 containers in the accumulator may be manipulated to improve detection of the container identifiers. At 714 containers may be grasped and moved to known locations based on the detected container identifiers. At 716, containers may be moved from known locations in accumulation areas into a container group based on the orders. The formation of the container group may occur after all components (or subcomponents) of an order have been received at the accumulator. At 718, literature, that is associated with the orders, may be created, and at 720 the literature may be packaged with the container group.

Figure 8:
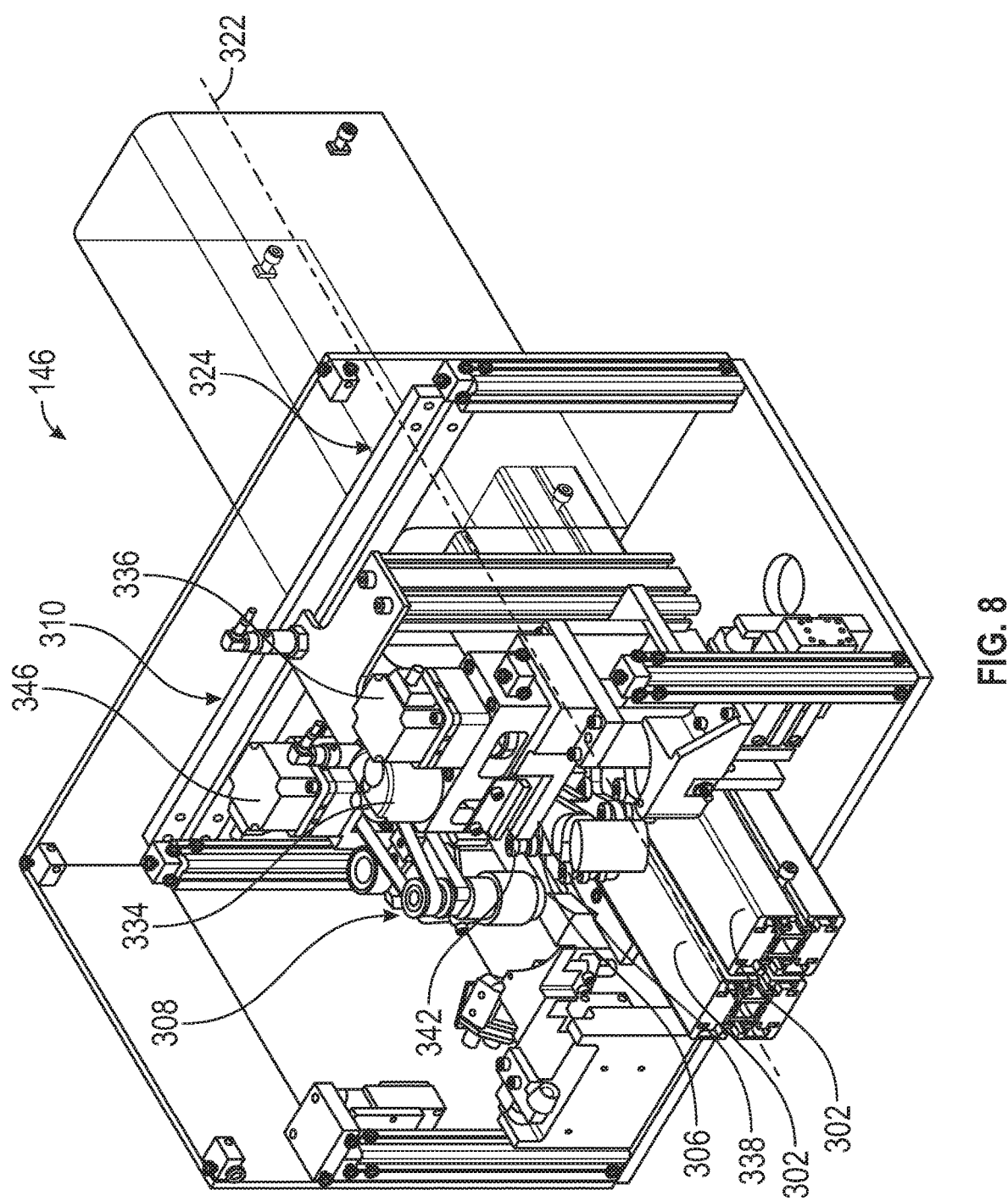
FIG. 8 illustrates, by way of example and not limitation, a perspective view of a container sorting device such as may be used with the system shown in FIG. 1, FIG. 3 or FIG. 4.
Figure 9:
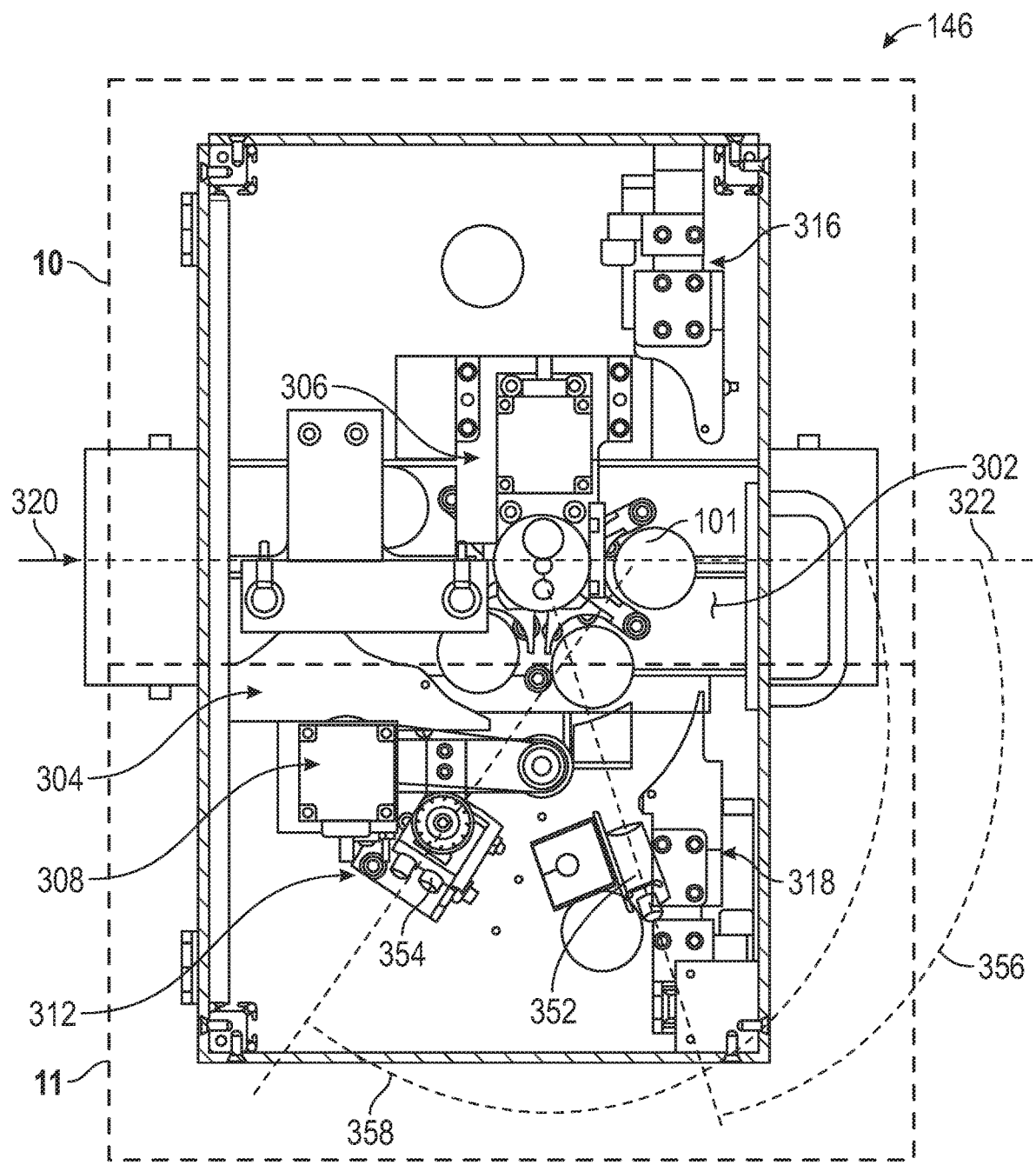
FIG. 9 is a top view of the container sorting device shown in FIG. 8.
Figure 10:
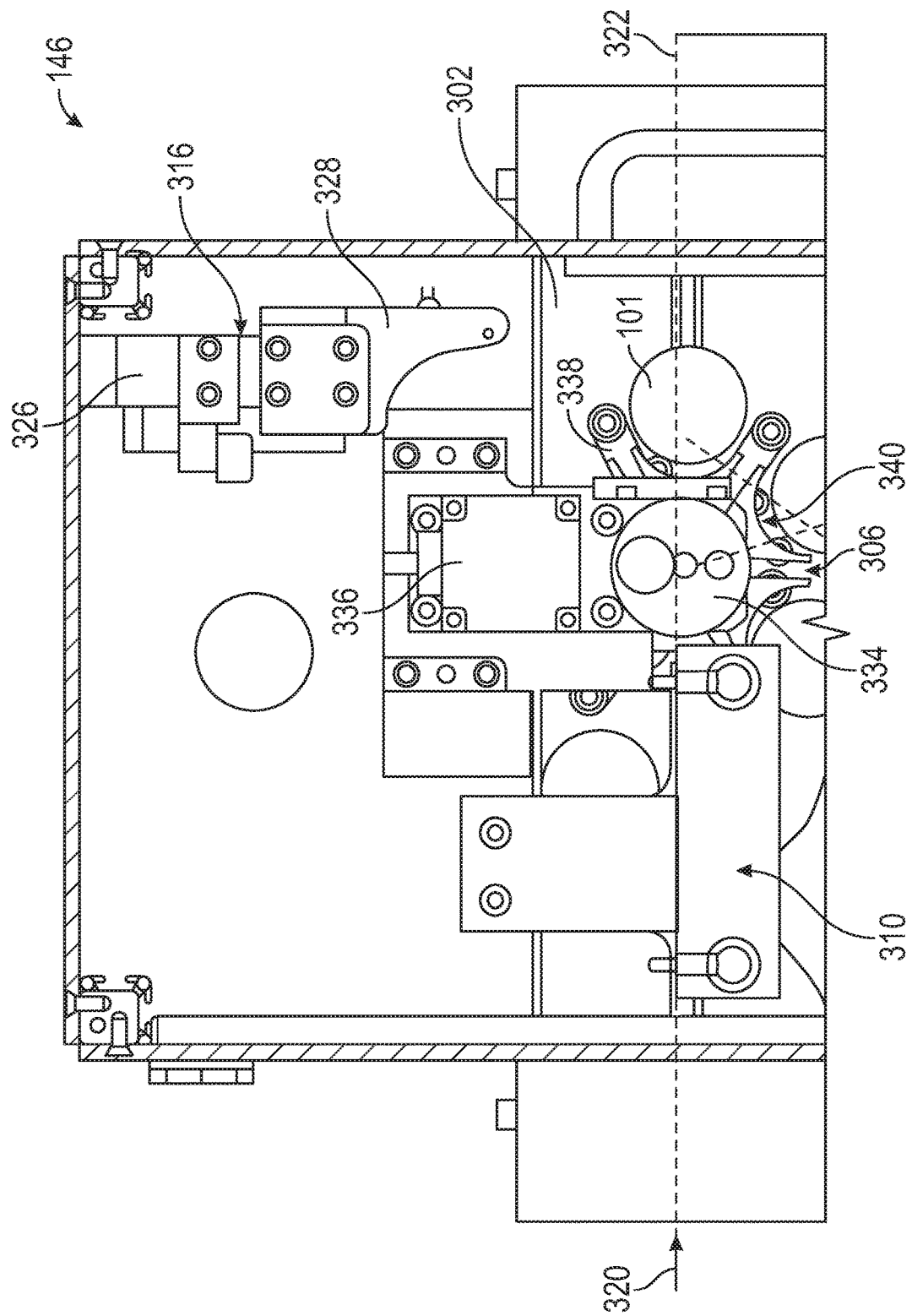
FIG. 10 is an enlarged top view of a portion of the container sorting device shown in FIG. 9.
Figure 11:
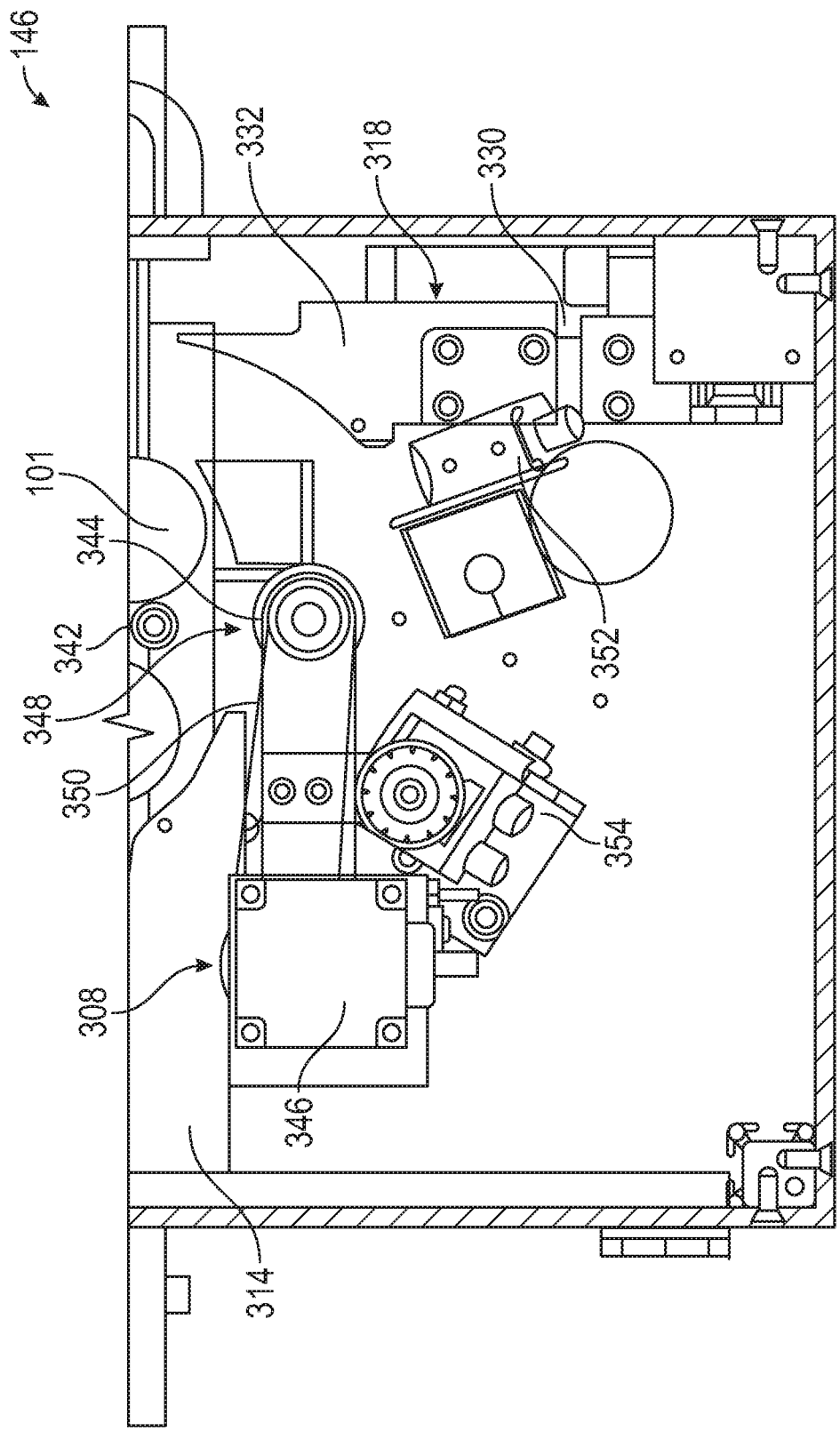
FIG. 11 is an enlarged top view of a portion of the container sorting device shown in FIG. 9.
Figure 12:
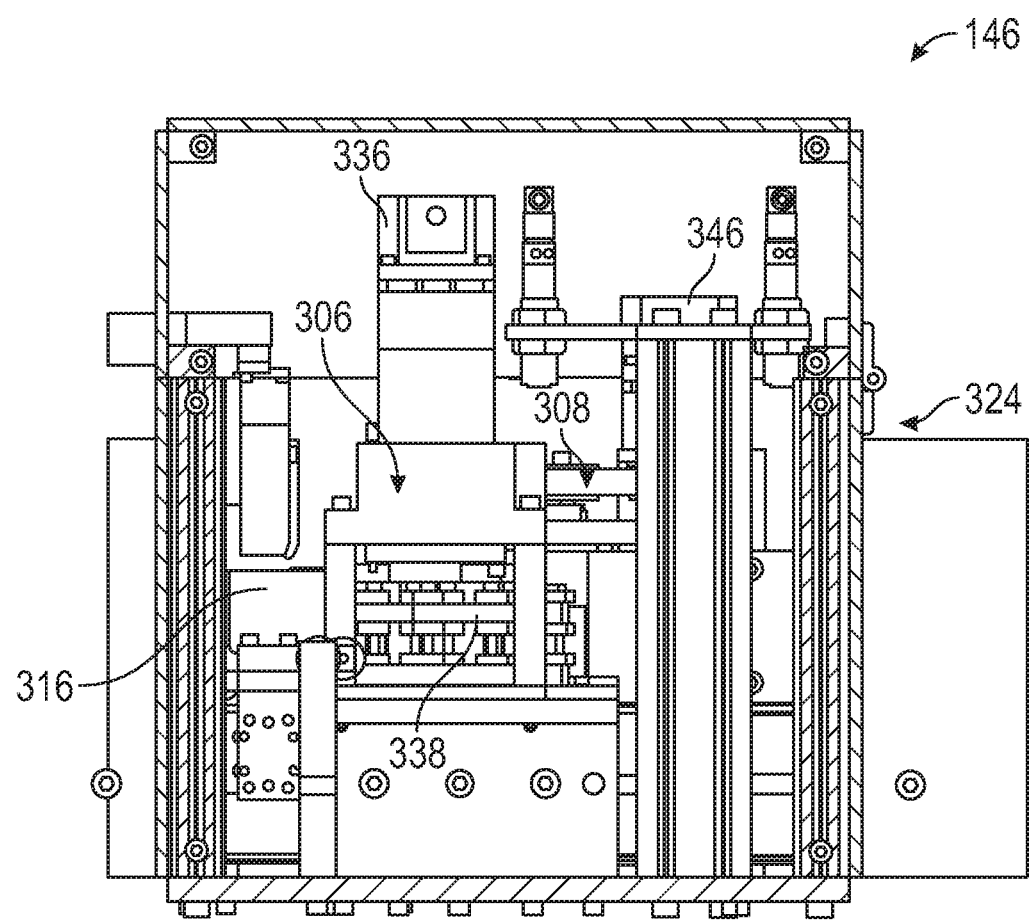
FIG. 12 is a front view of the container sorting device shown in FIG. 8.
Figure 13:
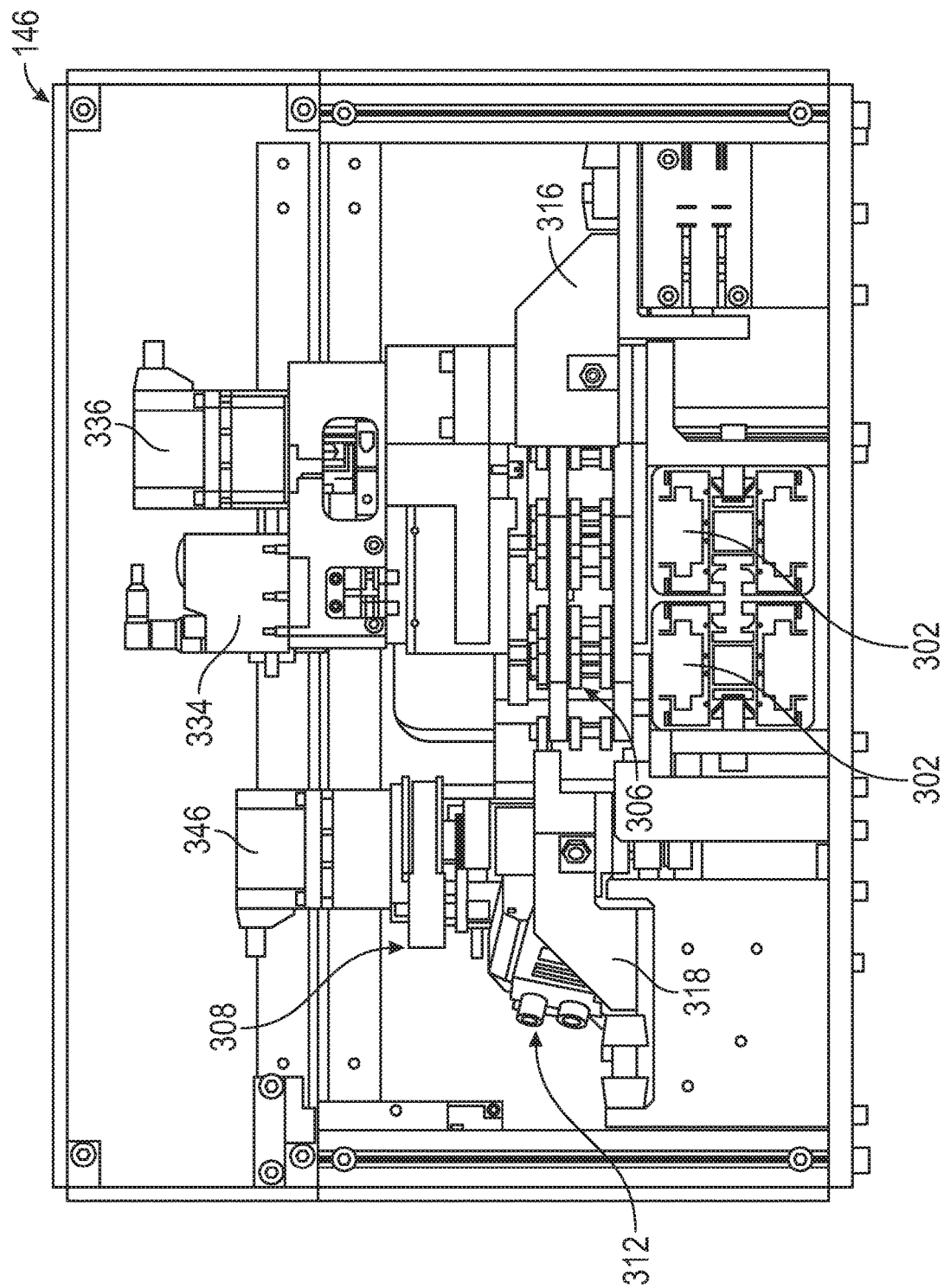
FIG. 13 is a side view of the container sorting device shown in FIG. 8.

FIGS. 8-13 illustrate various views of the container sorting device 146, according to an example embodiment. FIG. 8 illustrates, by way of example and not limitation, a perspective view of a container sorting device 146 such as may be used with the system shown in FIG. 1, FIG. 3 or FIG. 4., FIG. 9 is a top view of the container sorting device 146, FIG. 10 is an enlarged top view of a portion of the container sorting device indicated in FIG. 9, FIG. 11 is an enlarged top view of a portion of the container sorting device indicated in FIG. 9, FIG. 12 is a front view, and FIG. 13 is a side view thereof.

The container sorting device 146 may be configured to facilitate imaging and diverting containers 101 to one of two material handling areas 302 (e.g. part of exit paths) from the sorting device, as part of processing a pharmacy order within the controls cage portion of the pharmacy order processing system 300. The container sorting device 146 may include a container guide assembly 304, at least two material handling areas 302, a container translation assembly 306, a container rotation assembly 308, a sensor assembly 310, and an imaging assembly 312 that includes cameras 352 and 354. The container guide assembly 304 may include multiple container guides 314 that allow the containers to be positioned correctly and relieve back pressure from the upstream containers, a first escapement assembly 316, and a second escapement assembly 318.

The container guide assembly 304 may at least partially define a container flow path 320 between the container guides 314, the first escapement assembly 316, the second escapement assembly 318, the container rotation assembly 308, and the container translation assembly 306. The container guides 314 may extend along a sorting device longitudinal axis 322 and along and across portions of the two material handling devices 148 to facilitate guiding the containers 101 to positions within the container sorting device 146 that facilitate operation of the container sorting device 146 as described herein. More specifically, the container guides 314 may be configured to facilitate guiding the containers 101 from a receiving side 324 of the container sorting device 146 to one of the two material handling areas 302. In this embodiment, the container guides 314 may be fabricated from a wear-resistant, low-friction polymer material, for example ultra-high-molecular-weight polyethylene, polyoxymethylene, or anodized aluminum.

The first escapement assembly 316 may include a first escapement actuator 326 and a first escapement locating arm 328 coupled to the first escapement actuator 326. The first escapement actuator 326 may be configured to extend such that the first escapement locating arm 328 extends across at least a portion of the two material handling areas 302 to provide a closed path for the container 101 across the width of the conveyor. The second escapement assembly 318 may include a second escapement actuator 330 and a second escapement locating arm 332 connected to the second escapement actuator 330. The second escapement actuator 330 may be configured to extend such that the second escapement locating arm 332 cooperates with the first escapement locating arm 328 to guide the container 101 into one of the two material handling areas 302, which can include conveyors. The first escapement locating arm 328 and the second escapement locating arm 332 may be fabricated of a wear-resistant metal alloy. In other embodiments, the first escapement locating arm 328 and the second escapement locating arm 332 may be fabricated from a polymer material.

The container translation assembly 306 may include position feedback sensing device or an encoder 334 and a drive motor 336 configured to move a star wheel 338. The star wheel 338 may include six container recesses 340, and each container recess 340 may be configured to receive one container 101. In other embodiments, the star wheel 338 may include more or less than six container recesses 340 as needed/desired to facilitate operation of the container translation assembly 306. The container translation assembly 306 may be configured to cooperate with the container guides 314 of the container guide assembly 304 to retain the received containers 101 within the container recesses 340 during operation of the container translation assembly 306. The star wheel 338 of the container rotation assembly 308 may be configured to move the received containers 101 from the receiving side 324 of the container sorting device 146 to one of two material handling areas 302. After the container translation assembly 306 has moved the received containers 101 from the receiving side 324 to one of the two material handling areas 302, the container translation assembly 306 may be configured to release the received containers 101 in the one of the two material handling areas 302.

Each of the container recesses 340 may have a diameter substantially similar to a diameter of the containers 101 to respective retain containers 101 therein. The drive motor 336 may be configured to cause the star wheel 338 to rotate in a counterclockwise direction (when viewed from above) and the encoder 334 is configured to monitor the position of the star wheel 338 throughout its range of motion for communication to a control device, for example. In other embodiments, the star wheel 338 may be configured to rotate in a clockwise direction. In some embodiments, the star wheel 338 may be configured to rotate in both a clockwise direction and a counterclockwise direction. In yet other embodiments, the container translation assembly does not include a rotating portion but may instead cause the containers 101 to translate from the receiving side 324 to the one of the two material handling areas 302. The star wheel 338 may be suitably made of an anodized aluminum assembly, ultra-high-molecular-weight polyethylene, or polyoxymethylene, among other materials.

In some embodiments, each of the container recesses 340 may also include multiple rollers 342 positioned around an inner perimeter of the container recesses 340 to facilitate rotation of the containers 101 while the containers 101 are within the container recesses 340. In other embodiments, the container recesses 340 may include a low friction material extending along the inner perimeter of the container recesses 340 to facilitate rotation of the containers 101 relative to the star wheel 338 during operation of the container sorting device 146. In additional embodiments, the star wheel 338 may include any number and configuration of container recesses 340 that facilitates operation of the container sorting device 146.

The container sorting device 146 may include a container rotation assembly 308 configured to cause the received containers 101 to rotate in the container recesses 340 within the star wheel 338. The container rotation assembly 308 may include a wrap wheel, rotational wheel or container interface 344 and a container interface drive 346. The container interface 344 may be positioned to contact the received containers 101 at a rotation position 348 while the containers 101 are in the container recesses 340. The container interface drive 346 may be configured to cause the container interface 344 to rotate such that the container 101 is caused to rotate within the star wheel 338 when the container interface 344 and the container 101 are in contact. In this embodiment, the container interface 344 may be configured to rotate in a counter-clockwise direction such that the containers 101 are caused to rotate in a clockwise direction when in contact with the container interface 344 to facilitate locating and scanning a label of the container 101 by the imaging assembly 312. The container interface 344 may be suitably made of low density, low Rockwell number, rubberized material that will help to grip and rotate the container 101.

The container interface drive 346, as shown, may be an electric motor connected to the container interface 344 via a flexible belt 350. The container interface drive may be, by way of example and not limitation, a thirty-watt direct current (DC) brushless motor. In other embodiments, the container interface drive 346 may be any type of power source connected to the container interface 344 in any manner that facilitates operation of the rotation assembly 308 as described herein, such as, but not limited to a pneumatic actuator rotational device. The container interface 344 may be a roller having a coefficient of friction such that, when the received container 101 is in contact with the container interface 344 during operation of the container sorting device 146, the received container 101 is caused to rotate in a direction opposite to a direction of rotation of the container interface 344. In other embodiments, the container rotation assembly 308 may include any components configured in any manner that facilitates operation of the container sorting device 146 as described herein.

The imaging assembly 312 may include a first scanner 352 and a second scanner 354. Each scanner 352, 354 may be configured to image the received containers 101 during operation of the container rotation assembly 308 while the received containers 101 are in the container recesses 340. The first scanner 352 and the second scanner 354 may be configured to image a label, or other identifying marks, on the containers 101 to facilitate identification and routing of the containers 101 by the container sorting device 146. The first scanner 352 may be oriented at a first angle 356 relative to the sorting device longitudinal axis 322, and the second scanner 354 may be oriented at a second angle 358 relative to the sorting device longitudinal axis 322. For example, the first scanner 352 and the second scanner 354 may be MicroHawk ID-40 Microscan WVGA scanners due to the relatively high speed at which these scanners can read and process one-dimensional and two-dimensional barcodes and their relatively large area of view. In other embodiments, the imaging assembly 312 can include any number, configuration, and type of scanners and illumination devices that facilitate operation of the imaging assembly 312 as described herein. For example, the imaging assembly 312 may include an RFID scanner that reads an RFID tag on the container 101.

The material handling devices 148 may extend between the accumulation devices 140, the inspect devices 126, and the container sorting devices 146. The material handling devices 148 may be conveyors configured to move the containers 101 between the accumulation devices 140, the inspect devices 126, and/or the container sorting devices 146. One material handling device 148 may carry containers 101 to the receiving side 324 of the container sorting device 146 and may extend through the container sorting device 146 to define a first of the two material handling areas 302 on the opposite side of the container sorting device 146. The material handling areas 302 may be considered to be part of the container exit paths 458 and 460 illustrated in FIG. 4. Another material handling device 148 may extend from approximately the receiving side 324 of the container sorting device 146 through the container sorting device 146 to define the second of the two material handling areas 302 on the side of the container sorting device 146 opposite the receiving side 324. The two material handling areas 302 may enable two options or two different material handling devices 148 for the container 101. The two material handling devices 148 may extend from the respective material handling areas 302 to downstream portions of the controls cage, such as the accumulation device 140 and the inspect device 126, for example.

Figure 14:
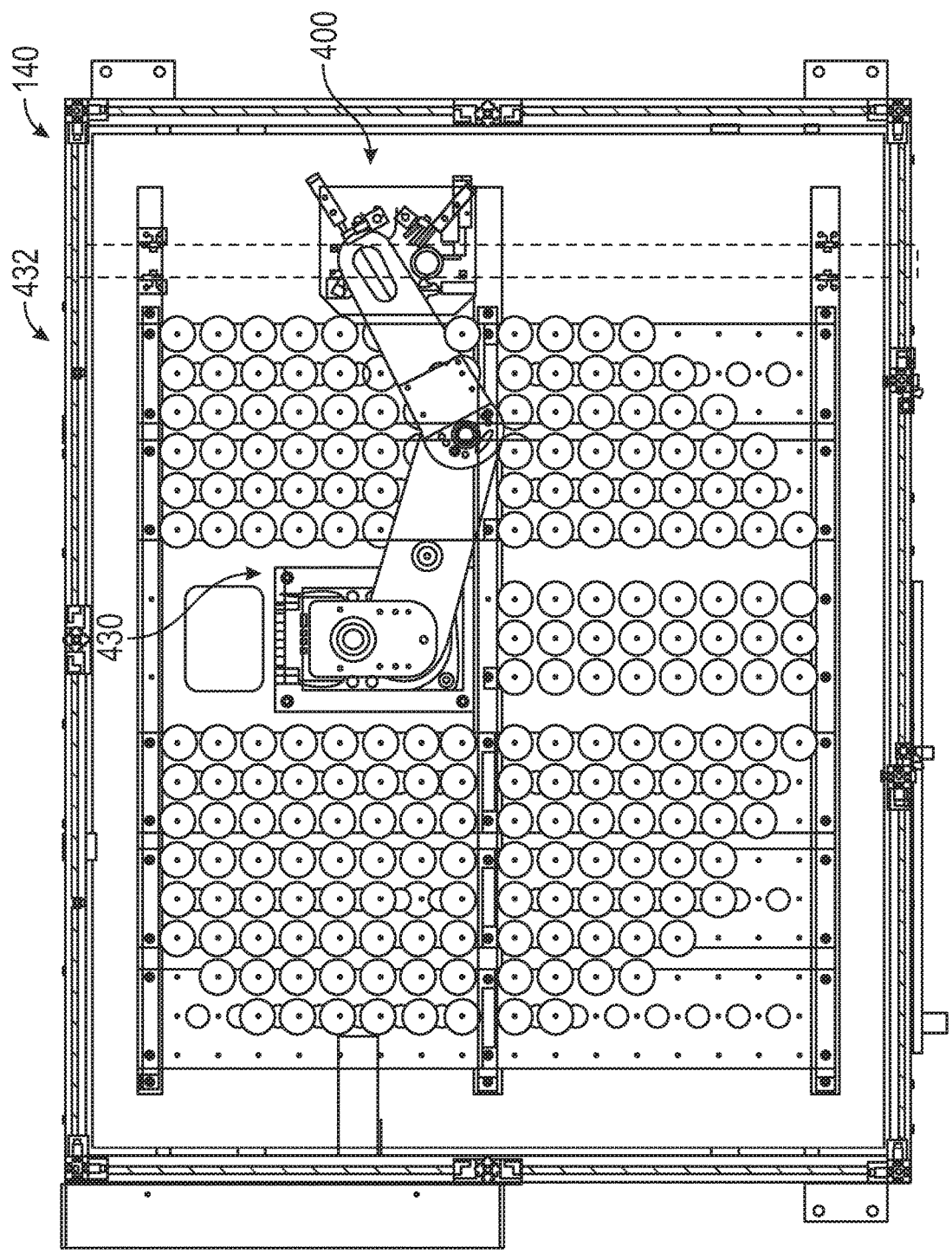
FIG. 14 illustrates, by way of example and not limitation, a top view of an accumulator including an example accumulator scanning device such as may be used with the system shown in FIG. 1, FIG. 3 or FIG. 4.
Figure 15:
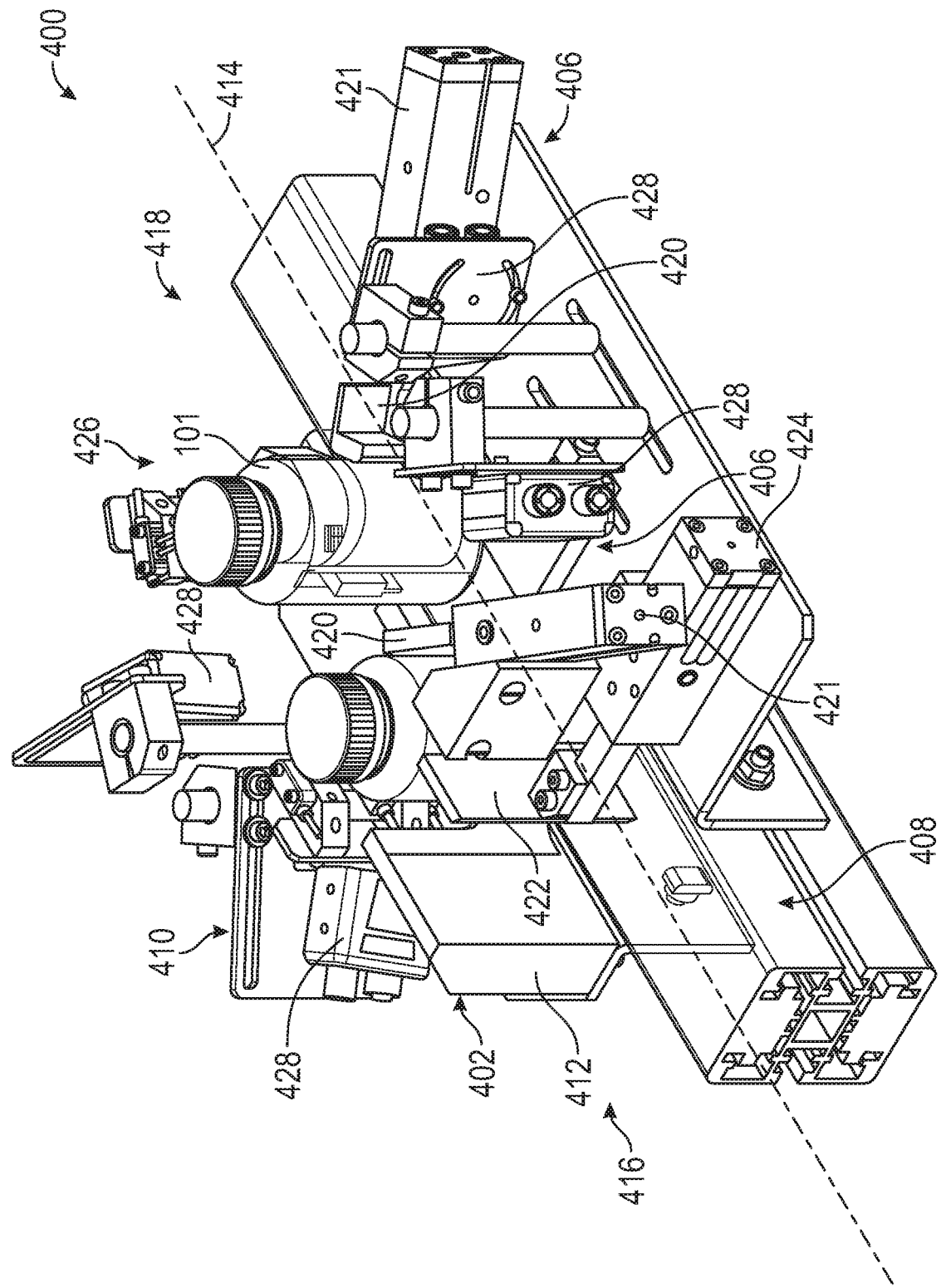
FIG. 15 is a perspective view of the accumulator scanning device shown in FIG. 14.

FIG. 14 illustrates, by way of example and not limitation, a top view of an accumulator including an example accumulator scanning device such as may be used with the system shown in FIG. 1, FIG. 3 or FIG. 4. The illustrated accumulation device 140 may be deployed within the controls cage portion of the pharmacy order processing system 300 (shown in FIG. 3), or may otherwise be deployed. FIG. 15 is a perspective view of the accumulator scanning device 400 and FIG. 16 is a top view thereof.

Figure 16:
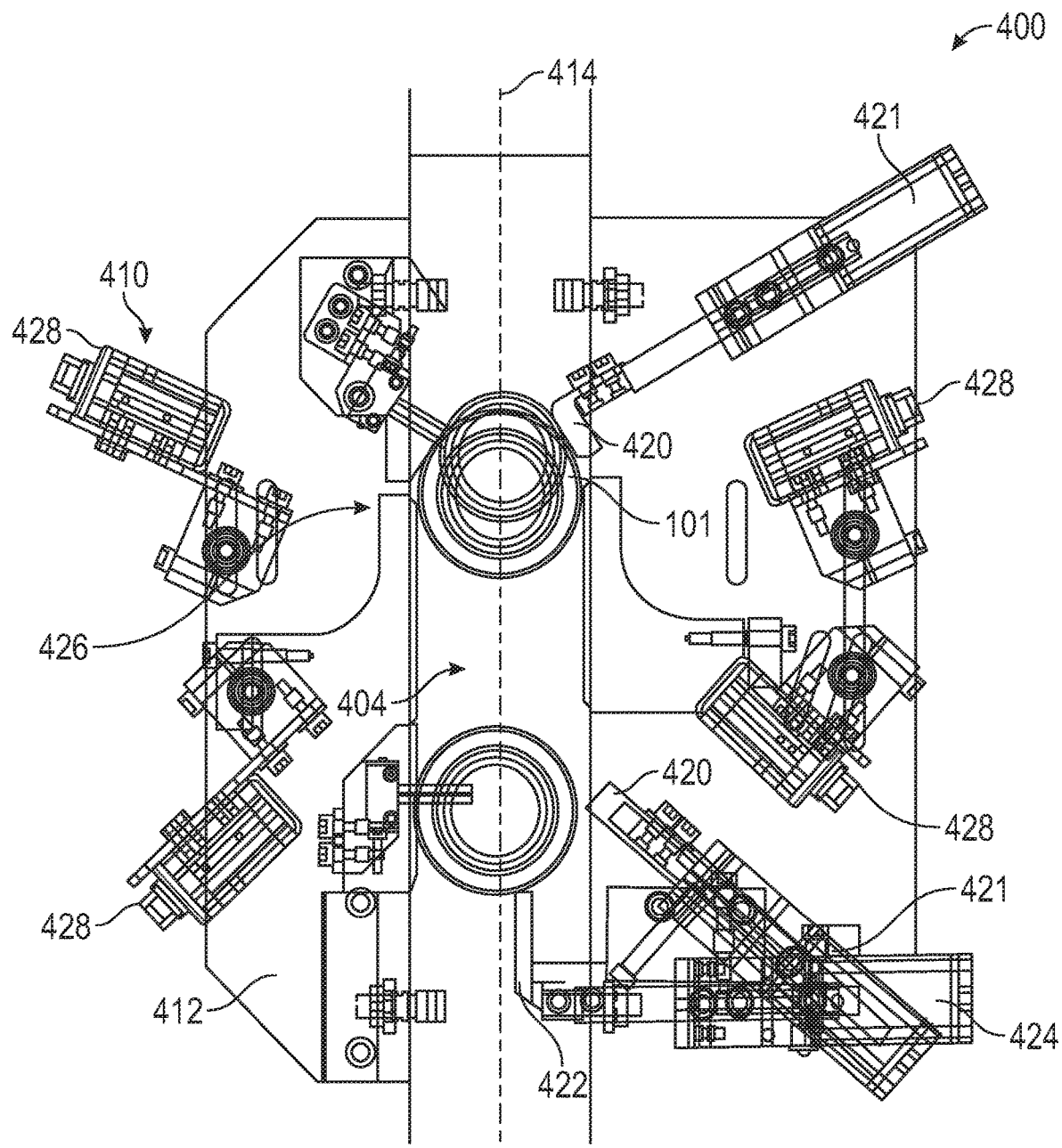
FIG. 16 is a top view of the accumulator scanning device shown in FIG. 14.

Referring to FIGS. 14-16, the accumulator scanning device 400 may be generally configured to facilitate imaging and identifying containers 101 entering the accumulation device 140 for correct placement of the containers 101 within the accumulation device 140 as part of processing a pharmacy order within the pharmacy order processing system 300. The accumulator scanning device 400 may include an accumulator guide assembly 402 defining a container guide area 404, a stop gate assembly 406, a push gate assembly 408, an accumulator imaging assembly 410, and a material handling device 148 extending through the container guide area 404.

The accumulator guide assembly 402 may include scanning device walls 412 that extend along opposite sides of the material handling device 148. The material handling device may define a scanning device longitudinal axis 414. The scanning device walls 412 may be configured to facilitate guiding the containers 101 from a scanning device receiving side 416 to a scanning device exit side 418.

The stop gate assembly 406 may be generally configured to inhibit the containers 101 from entering the container guide area 404 from the scanning device receiving side 416. The stop gate assembly 406 of this embodiment may include a stop gate 420 and a stop gate actuator 421 connected to the stop gate 420 and configured to extend at an angle relative to the scanning device longitudinal axis 414 such that the stop gate 420 contacts a container 101 and inhibits the container 101 from entering the container guide area 404.

The push gate assembly 408 may be configured to cooperate with a portion of the accumulator guide assembly 402 to locate a container 101 such that the container 101 may be illuminated and scanned. For example, the push gate assembly 408 may include a push gate 422 and a push gate actuator 424 connected to the push gate 422 and configured to extend at an angle relative to the scanning device longitudinal axis 414 such that the push gate 422 contacts a container 101 and retains the container 101 within a container scanning position 426 to facilitate scanning of the container 101.

The accumulator imaging assembly 410 may be configured to scan the containers 101 as they pass through the accumulator scanning device 400. The accumulator imaging assembly 410 may include four scanners 428 positioned radially about the container scanning position 426 at evenly spaced intervals such that the scanners 428 are operable to image circumferences of the containers 101 while the containers 101 are located within the container guide area 404. By way of example, the scanners 428 may be MicroHAWK ID-40 WVGA scanners incorporating extra red illumination to facilitate illuminating and imaging the containers 101. If the container 101 is situation in such a manner to prevent accurate scanning, the container 101 may be rotated by a container manipulation device 430 to allow for accurate scanning. After each container 101 is scanned by the accumulator imaging assembly 410, the container manipulation device 430 of the accumulation device 140 may grasp a portion of the container 101 and move the container 101 from the accumulator scanning device 400 to one of a plurality of accumulation areas 432 for further processing within pharmacy order processing system 100. The accumulation areas 432 can store containers until it is mated up with at least one other container, e.g., within a same order. This can store medications until an entire order is brought together, e.g., at the accumulation area.

Figure 17:
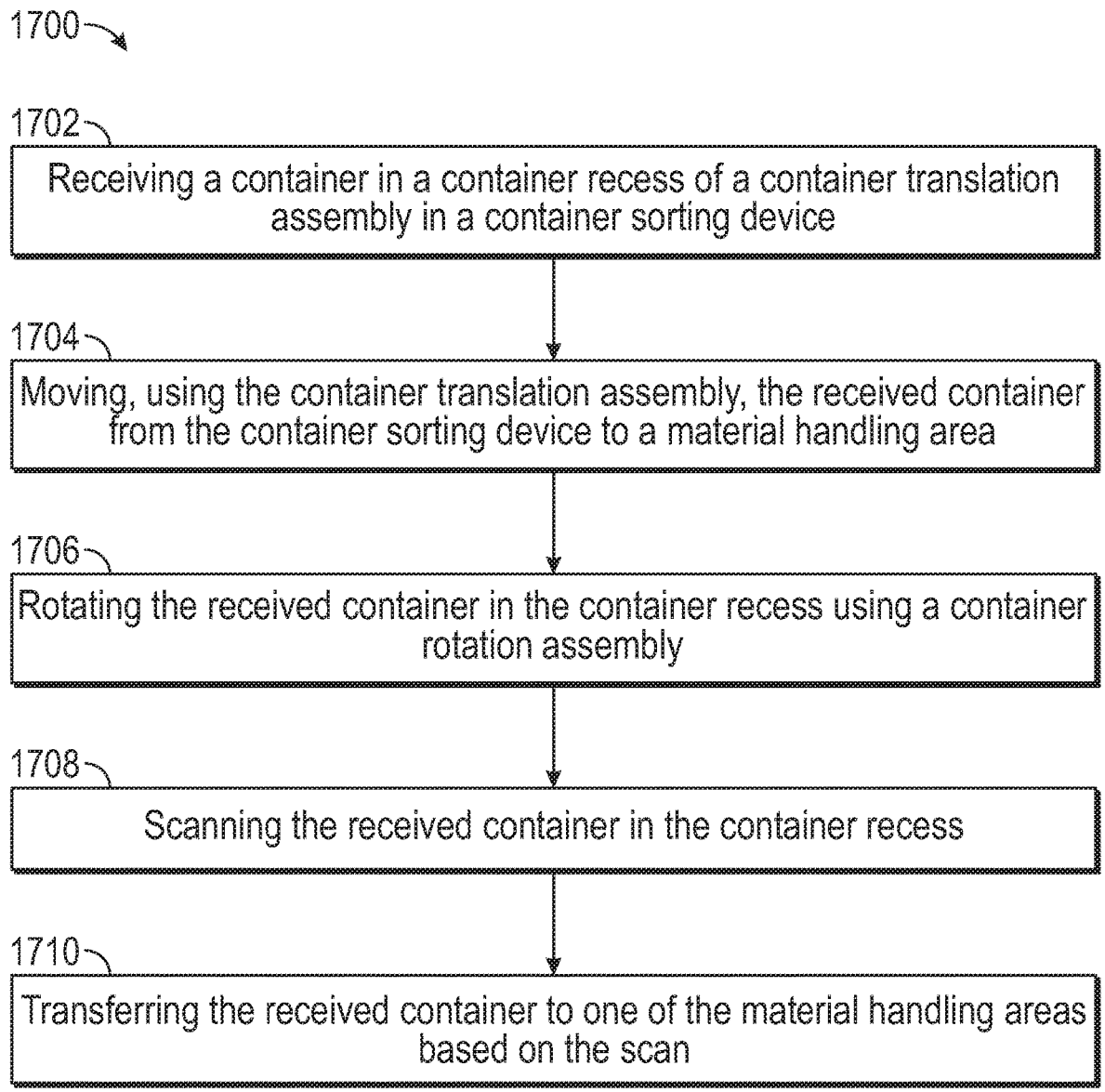
FIG. 17 illustrates, by way of example and not limitation, a method for scanning and sorting containers such as may be performed using the container sorting device shown in FIG. 8.

FIG. 17 illustrates, by way of example and not limitation, a method 1700 for scanning and sorting containers 101 such as may be performed using the container sorting device 146 shown in FIG. 8. At block 1702, a container 101 is received using, for example, the container recess 340 in a star wheel of the container translation assembly 306 of the container sorting device 146. At block 1704, the received container 101 is moved from the receiving side 324 of the container sorting device 146 to one of the two material handling areas 302 using, for example, the container translation assembly 306. The container translation assembly 306 is configured as described above to cooperate with the container guide assembly 304 to retain the received container 101 within the container recess 340. The received container 101 is rotated in the container recess 340 at block 1706. The rotation may be performed by the container rotation assembly 308, or may otherwise be performed. For example, the operations performed at block 1706 may include rotating the star wheel 338 in one of a clockwise and a counter-clockwise direction such that the container 101 is moved from a receiving side to one the two material handling areas 302. Generally, the rotation may be performed by any type of rotational movement device. At block 1708, the received container 101 is scanned in the container recess 340. The scanning may be performed by the imaging assembly 312 or may otherwise be performed. The received container 101 may be transferred to one of the two material handling areas 302 at block 1710 based on the scanning of the received container 101. The operations performed at block 1710 may be performed by the container translation assembly 306, or may otherwise be performed.

Embodiments of the methods and systems described herein achieve superior results as compared to prior methods and systems. For example, unlike some known order processing systems, the order processing systems described herein are configured to facilitate rapidly and efficiently sorting pharmaceutical containers between at least two material handling areas. In particular, the container sorting devices described are operable such that multiple pharmaceutical containers may be rapidly sorted between at least two material handling areas using a container translation assembly based on the results of scanning the multiple pharmaceutical containers such that the prescription orders that each container is associated with may be determined, enabling a greater throughput at each container sorting device and within the high volume pharmacy overall. As a result, specialty, custom, and high-volume pharmacies can be retrofitted with the container sorting devices and systems, thereby increasing the efficiency and throughput of existing specialty and custom pharmacies. In some embodiments, the order processing systems can have accumulation devices that include accumulator scanning devices that are configured to scan multiple containers entering the accumulation devices from various components of the order processing system.

The term "based on" or using, as used herein, reflects an open-ended term that can reflect others elements beyond those explicitly recited. Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The embodiments of the present disclosure generally provide for a plurality of circuits or other electrical devices, which can be used in units, modules, systems, and subsystems and the like. All references to such and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical/operational implementation that is desired. It is recognized that any circuit or other electrical device disclosed herein may include any number of microprocessors, discrete circuit components, integrated circuits, memory devices (e.g., FLASH, random access memory (RAM), read only memory (ROM), electrically programmable read only memory (EPROM), electrically erasable programmable read only memory (EEPROM), or other suitable variants thereof, etc.) and instructions (e.g., software, etc.) which co-act with one another to perform operation(s) disclosed herein. In addition, any one or more than one electric device may be configured to execute a computer-program that is embodied in a computer readable medium that is programmed to perform any number of the functions and features as disclosed. The computer readable medium may be non-transitory or in any form readable by a machine or electrical component.

At least some portions of the present disclosure may be accomplished by using a robot. A robot can be a machine capable of carrying out a complex series of actions automatically. These complex series of actions may include picking up, orientating, positioning and/or releasing a prescription component, a pill, a container or other structure. The robot may be dedicated to a single series of movements or may be able to execute multiple series of movements. A robot may include a processor that received instructions and then executes instructions to control its movement. In another example, a robot may resemble a human being and replicate certain human movements and functions, may move location, have an articulated arm, have grasping structures that replicate fingers and do not damage containers, and the like.

Methods and systems for pharmacy order processing, including imaging, identifying, diverting, and directing containers containing pharmaceuticals of a pharmaceutical order using a container sorting device have been described. Although embodiments of the present disclosure have been described with reference to specific example embodiments, it will be evident that various modifications and changes may be made to these embodiments without departing from the broader spirit and scope of the embodiments of the disclosure. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks may be shown in the flowcharts, the methods may be performed continuously.

In the foregoing, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more than one steps within a method may be executed in different order (or concurrently) without altering the principles of the present disclosure. Further, although each of the embodiments is described above as having certain features, any one or more than one of those features described with respect to any embodiment of the disclosure can be implemented in and/or combined with features of any of the other embodiments, even if that combination is not explicitly described. In other words, the described embodiments are not mutually exclusive, and permutations of one or more than one embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more than one intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more than one interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuitry that, in combination with additional processor circuits, executes some or all code from one or more than one modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more than one modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general-purpose computer to execute one or more than one particular function embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more than one operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCam1, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Embodiments for pharmacy order processing using container disassembly workstations are described above in detail. The systems and methods of operating such systems are not limited to the specific embodiments described herein, but rather, components of systems and/or steps of the methods may be utilized independently and separately from other components and/or steps described herein. For example, the methods may also be used in combination with other systems and environments and are not limited to the environments as described herein. Rather, the embodiments can be implemented and utilized in connection with many other applications.

In this specification and the claims, reference is made to a number of terms, which shall be defined to have the following meanings:

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

The term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, cd-roms, dvds, and any other digital source such as a network or the internet, as well as yet to be developed digital means, with the sole exception being a transitory, propagating signal.

The terms "software" and "firmware" are interchangeable, and include any computer program stored in memory for execution by devices that include, without limitation, mobile devices, clusters, personal computers, workstations, clients, and servers.

The term "computer" and related terms, e.g., "computing device", are not limited to integrated circuits referred to in the art as a computer, but broadly refers to a microcontroller, a microcomputer, a programmable logic controller (plc), an application specific integrated circuit, and other programmable circuits, and these terms are used interchangeably herein.

Computer systems are described, and such computer systems include a processor and a memory. However, any processor in a computer device referred to may also refer to one or more processors wherein the processor may be in one computing device or a plurality of computing devices acting in parallel, such as in a cloud computing environment. Additionally, any memory in a computer device referred to may also refer to one or more memories, wherein the memories may be in one computing device or a plurality of computing devices acting in parallel.

A processor may include any programmable system including systems using micro-controllers, reduced instruction set circuits (risc), application specific integrated circuits (asics), logic circuits, and any other circuit or processor capable of executing the functions described herein. The above examples are example only, and are thus not intended to limit in any way the definition and/or meaning of the term "processor." The term "database" may refer to either a body of data, a relational database management system (rdbms), or to both. A database may include any collection of data including hierarchical databases, relational databases, flat file databases, object-relational databases, object oriented databases, and any other structured collection of records or data that is stored in a computer system. The above are only examples, and thus are not intended to limit in any way the definition and/or meaning of the term database. Examples of rdbms's include, but are not limited to including, Oracle® Database, Mysql, IBM® Db2, Microsoft® Sql Server, Sybase®, and Postgresql. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In some embodiments, a computer program is embodied on a computer readable medium. In other embodiments, the system is executed on a single computer system, without requiring a connection to a server computer. In still other embodiments, the system is run in a Windows® environment (windows is a registered trademark of Microsoft corporation, Redmond, Wash.). In yet another embodiment, the system is run on a mainframe environment and a Unix® server environment (Unix is a registered trademark of x/open company limited located in reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The inventive subject matter may be represented in a variety of different embodiments of which there are many possible permutations. Although specific features of various embodiments of the invention may be shown in some drawings and not in others, this is for convenience only. In accordance with the principles of the invention, any feature of a drawing may be referenced and/or claimed in combination with any feature of any other drawing. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The above detailed description is intended to be illustrative, and not restrictive. The scope of the disclosure should, therefore, be determined with references to the appended claims, along with the full scope of equivalents to which such claims are entitled.

What is claimed is:

1. An order processing system, comprising:
   a material handling system configured to move a plurality of containers through a plurality of container paths, the plurality of container paths includes a container sorting input path, a first container sorting output path, a second container sorting output path, at least one accumulator input path, an accumulator output path;
   a container sorting device configured to receive the plurality of containers from the container sorting input path of the material handling system, scan the plurality of containers to detect container identifiers for the plurality of containers, and separate the containers based on the container identifiers to travel through a first container exit path from the container sorting device or travel through second container exit path from the container sorting device;
   an accumulator configured to accumulate containers that traveled through the first container exit path and containers that traveled through the second container exit path, wherein the accumulator includes an accumulator scanning device configured to scan the containers to detect the container identifiers and to group the containers together based on the detected container identifiers and orders, and provide the grouped containers onto an accumulator output path;
   a packing device configured to package the grouped containers along with literature associated with the orders; and
   a controller in communication with a database and configured to control movement of the containers through the material handling system, the container sorting device, the accumulator and the packing device based at least on the orders and the detected container identifiers.

2. The order processing system of claim 1, wherein the containers that travel through the first container exit path travel through a control cage portion of an order processing station before traveling to the accumulator, and the containers that travel through the second container exit path do not travel through the control cage portion of an order processing station before traveling to the accumulator.

3. The order processing system of claim 1, wherein the containers that travel through the first container exit path travel through a manual fulfillment area of an order processing station before traveling to the accumulator, and the containers that travel through the second container exit path do not travel through the manual fulfillment area of an order processing station before traveling to the accumulator.

4. The order processing system of claim 1, wherein the containers that travel through the first container exit path travel through an inspect area of an order processing station before traveling to the accumulator, and the containers that travel through the second container exit path do not travel through the inspect area of an order processing station before traveling to the accumulator.

5. The order processing system of claim 1, wherein the containers that travel through the first container exit path travel through a rework area of an order processing station before traveling to the accumulator, and the containers that travel through the second container exit path do not travel through the rework area of an order processing station before traveling to the accumulator.

6. The order processing system of claim 1, wherein the container sorting device is configured to rotate each individual container of the plurality of containers when scanning the individual container to detect the container identifiers.

7. The order processing system of claim 1, wherein the container sorting device includes:
   a star wheel having container recesses configured to receive containers from the plurality of containers, the star wheel being configured to rotate to move individual ones of the containers with individual ones of the container recesses, each of the container recesses including a plurality of rollers configured to facilitate rotation of the containers in the container recesses;
   a container interface configured to contact at least one of the containers in the container recesses; and
   a container interface drive configured to rotate the container interface such that the at least one of the containers is caused to rotate in a respective one of the container recesses.

8. The order processing system of claim 1, wherein the accumulator includes a container manipulator device configured to manipulate individual ones of the containers to improve detection of the container identifiers.

9. The order processing system of claim 8, wherein the container manipulation device is configured to grasp and move individual ones of the containers from the accumulator scanning device to known locations based on the detected container identifier for the individual ones of the containers.

10. The order processing system of claim 1, wherein the accumulator includes a container manipulator device configured to grasp and move at least one container from known locations in the plurality of accumulation areas into a container group based on the orders, and a literature creation device configured to create the literature associated with the orders for packaging by the packing device with the container group.

11. The order processing system of claim 1, wherein the controller includes a distributed controller.

12. A method, comprising:
    receiving, at a container sorting device, a plurality of containers from a container sorting input path;

sorting the plurality of containers at the container sorting device, including scanning the plurality of containers to detect container identifiers for the plurality of containers and separating the plurality of containers based on the container identifiers to travel through a first container exit path from the container sorting device or travel through second container exit path from the container sorting device;

accumulating, at an accumulator, containers that traveled through the first container exit path and containers that traveled through the second container exit, including scanning the containers to detect the container identifiers, grouping the containers together based on the detected container identifiers and orders, and providing the grouped containers onto an accumulator output path from the accumulator; and packing the grouped containers along with literature associated with the orders.

13. The method of claim 12, wherein the containers that travel through the first container exit path travel through at least one of a control cage portion, a manual fulfillment area, an inspect area or a rework area of an order processing station before traveling to the accumulator, and the containers that travel through the second container exit path do not travel through the at least one of a control cage portion, a manual fulfillment area, an inspect area or a rework area of an order processing station before traveling to the accumulator.

14. The method of claim 12, wherein sorting the plurality of containers includes rotating each individual container of the plurality of containers at the container sorting device when scanning the individual container to detect the container identifiers.

15. The method of claim 14, wherein sorting the plurality of containers includes:
rotating a star wheel having container recesses configured to receive containers from the plurality of containers, the star wheel being configured to move individual ones of the containers with individual ones of the container recesses; and
rotating a container interface to rotate each individual container when rotating the star wheel.

16. The method of claim 12, further comprising manipulating individual ones of the containers in the accumulator to improve detection of the container identifiers.

17. The method of claim 12, further comprising grasping and moving individual ones of the containers to known locations based on the detected container identifier for the individual ones of the containers, moving at least one container from known locations in the plurality of accumulation areas into a container group based on the orders, and creating the literature associated with the orders for packaging by the packing device with the container group.

18. A container sorting device, comprising:
a container sorting input path configured to receive a plurality of containers;
at least a first container sorting output path and a second container sorting output path;
a container translation assembly configured to move the plurality of containers through the container sorting device;
a container rotation assembly configured to rotate the plurality of containers moving through the container sorting device; and a container imaging assembly configured to scan and detect container identifiers for the rotating plurality of containers moving through the container sorting device,
wherein the container translation assembly is further configured to separate the plurality of containers into the first container sorting output path or the second container sorting output path based at least on the detected container identifiers and orders.

19. The container sorting device of claim 18, wherein the container translation assembly includes a star wheel including a plurality of container recesses, wherein each of the plurality of container recesses has a diameter substantially similar to a diameter of each container of the plurality of containers, and wherein the star wheel is configured to rotate.

20. The container sorting device of claim 19, wherein each of the plurality of container recesses includes a plurality of rollers configured to facilitate rotation of the at least one container in the plurality of container recesses.

21. The container sorting device of claim 19, wherein the container rotation assembly includes a container interface and a container interface drive, wherein the container interface is positioned to contact at least one of the containers in the at least one container recess, and wherein the container interface drive is configured to rotate the container interface such that the at least one container is caused to rotate.

22. The container sorting device of claim 19, wherein the container sorting device includes at least one scanner configured to scan the received at least one container in the at least one container recess.

23. The container sorting device of claim 22, wherein the at least one scanner includes a first scanner oriented at a first angle relative to the at least one container in the at least one container recess and a second scanner orientated at a second angle relative to the at least one container in the at least one container recess.

24. The container sorting device of claim 18, wherein the container translation assembly includes:
an escapement assembly including an escapement actuator and an escapement arm connected to the escapement actuator, wherein the escapement actuator is configured to extend such that the escapement arm extends across at least a portion of at least two material handling areas, wherein a first of the at least two material handling areas corresponds to the first exit path and a second of the at least two material handling areas corresponds to the second exit path; and
a locating assembly including a locating actuator and a locating arm connected to the locating actuator, wherein the locating actuator is configured to extend such that the locating arm cooperates with the escapement arm to guide the at least one container into one of the at least two material handling areas.

25. A method performed by a container sorting device, comprising;
receiving a plurality of containers at a container sorting input path;
moving the plurality of containers through the container sorting device;
rotating the containers moving the container sorting device; and
detecting container identifiers for the plurality of containers by scanning the rotating plurality of containers moving through the container sorting device,
wherein moving the plurality of containers through the container sorting device includes separating the plurality of containers into the first container sorting output path or the second container sorting output path based at least on the detected container identifiers and orders.

26. The method of claim 25, wherein moving the plurality of containers through the container sorting device includes rotating a star wheel having container recesses configured to receive containers from the plurality of containers, the star wheel being configured to move individual ones of the containers with individual ones of the container recesses; and rotating a container interface to rotate each individual container when rotating the star wheel.

27. The method of claim 25, wherein moving the plurality of containers through the container sorting device includes moving individual ones of the plurality of containers into contact with a container interface and rotating the container interface to cause the individual ones of the plurality of containers to rotate.

28. The method of claim 25, wherein scanning the rotating plurality of containers includes using a first scanner oriented at a first angle relative to the at least one container in the at least one container recess and a second scanner orientated at a second angle relative to the at least one container in the at least one container recess.

\* \* \* \* \*

UNITED STATES PATENT AND TRADEMARK OFFICE
CERTIFICATE OF CORRECTION

| | | |
|---|---|---|
| PATENT NO. | : 11,548,037 B1 | Page 1 of 1 |
| APPLICATION NO. | : 16/581977 | |
| DATED | : January 10, 2023 | |
| INVENTOR(S) | : Robert E. Hoffman | |

It is certified that error appears in the above-identified patent and that said Letters Patent is hereby corrected as shown below:

In the Specification

In Column 15, Line 12 delete "C3-05" and replace with -- C3-C5 --
In Column 15, Line 20 delete "C3-05" and replace with -- C3-C5 --
In Column 15, Line 23 delete "C3-05" and replace with -- C3-C5 --

Signed and Sealed this
Twenty-first Day of February, 2023

Katherine Kelly Vidal
*Director of the United States Patent and Trademark Office*